United States Patent
Iikawa et al.

(10) Patent No.: US 7,213,693 B2
(45) Date of Patent: May 8, 2007

(54) ROTATIONAL TRANSFER MECHANISM

(75) Inventors: Makoto Iikawa, Saitama (JP); Takuji Hamasaki, Saitama (JP)

(73) Assignee: PENTAX Corporation, Tokyo (JP)

( * ) Notice: Subject to any disclaimer, the term of this patent is extended or adjusted under 35 U.S.C. 154(b) by 18 days.

(21) Appl. No.: 10/971,118

(22) Filed: Oct. 25, 2004

(65) Prior Publication Data

US 2005/0087416 A1 Apr. 28, 2005

(30) Foreign Application Priority Data

Oct. 27, 2003 (JP) .............................. 2003-365594

(51) Int. Cl.
*F16D 15/00* (2006.01)
*F16D 41/066* (2006.01)
(52) U.S. Cl. ..................... 192/38; 192/45; 192/107 T
(58) Field of Classification Search ................. 192/38, 192/223.2
See application file for complete search history.

(56) References Cited

U.S. PATENT DOCUMENTS

| 4,901,831 | A | * | 2/1990 | Ito et al. ........................ 192/38 |
| 4,982,823 | A | * | 1/1991 | Yoshida ........................ 192/38 |
| 5,915,514 | A | | 6/1999 | Nojiri et al. |
| 5,927,456 | A | * | 7/1999 | Monahan et al. ............. 192/38 |
| 6,206,164 | B1 | * | 3/2001 | Kurita ....................... 192/223.2 |
| 6,311,814 | B1 | * | 11/2001 | Nakagawa et al. ........... 192/45 |
| 2002/0005325 | A1 | * | 1/2002 | Yamada ....................... 192/38 |
| 2002/0046914 | A1 | * | 4/2002 | Saiko ........................... 192/38 |
| 2005/0094992 | A1 | * | 5/2005 | Hamasaki et al. .......... 396/144 |

FOREIGN PATENT DOCUMENTS

| JP | 6-193658 | 12/1992 |
| JP | 6-193658 | 7/1994 |
| JP | 8-177878 | 7/1996 |
| JP | 11-202181 | 7/1999 |
| JP | 2005113932 A | * 4/2005 |

OTHER PUBLICATIONS

U.S. Appl. No. 10/952,727 to Hamasaki et al., filed Sep. 30, 2004.
English language Abstract of JP 6-193659.
U.S. Appl. No. 11/062,855 to Hamasaki, which was filed on Feb. 23, 2005.

* cited by examiner

*Primary Examiner*—Richard M. Lorence
(74) *Attorney, Agent, or Firm*—Greenblum & Bernstein, P.L.C.

(57) ABSTRACT

A rotational transfer mechanism includes a rotary output shaft, a rotary input shaft positioned inside the rotary output shaft; a circumferentially-uneven-width-space forming portion having a cam surface, to form an accommodation space between the rotary input shaft and the torque transfer cylindrical surface; and a torque transfer member installed in the accommodation space. The cam surface shape is determined by defining a straight line through the rotational axis and the torque-transfer-member axis, defining an imaginary circle having the same shape as the torque transfer member on the straight line at a point where the imaginary-circle axis and the torque-transfer-member axis are symmetrical with respect to the rotational axis; determining a cam-surface determining circle which circumscribes the imaginary circle and the torque transfer member; and defining a circular arc which forms a part of the cam-surface determining circle as the cam surface.

26 Claims, 11 Drawing Sheets

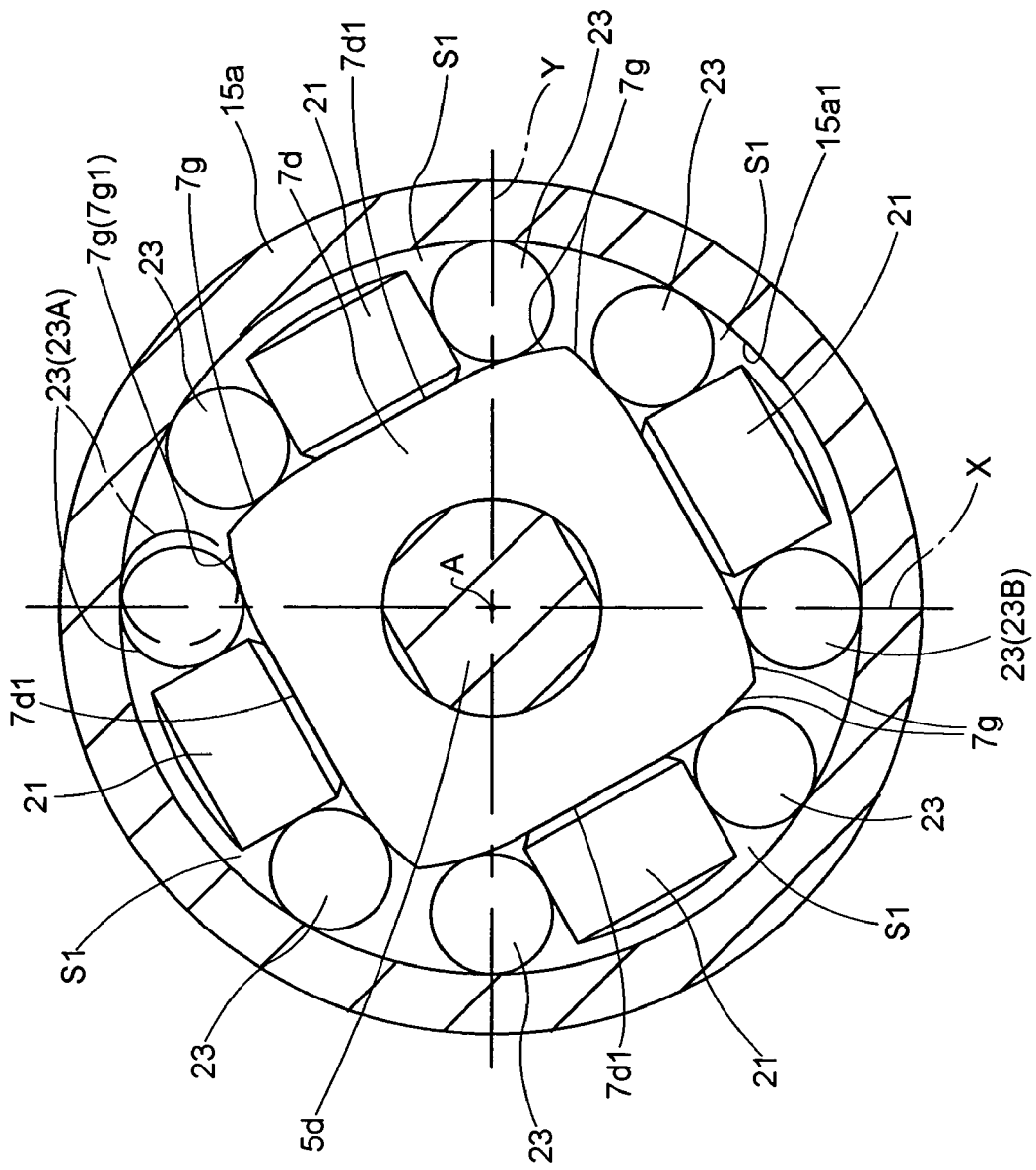

ROTATIONAL TRANSFER MECHANISM

BACKGROUND OF THE INVENTION

1. Field of the Invention

The present invention relates to a rotational transfer mechanism such as a one-way rotational transfer mechanism or a one-way clutch, and more specifically relates to the shape of a cam surface, provided in the rotational transfer mechanism, for transferring a torque of a rotary input shaft to a rotary output shaft.

2. Description of the Related Art

Among conventional one-way rotational transfer mechanisms having a rotary input shaft and a hollow-cylindrical rotary output shaft positioned radially outside the rotary input shaft, wherein the rotary input shaft is driven by motor to transfer rotation of the rotary input shaft to the hollow-cylindrical rotary output shaft, a one-way rotational transfer mechanism which prevents the motor from being rotated by rotation of the rotary output shaft (i.e., prevents the rotary input shaft from being rotated by rotation of the rotary output shaft) when the rotary output shaft is rotated has been disclosed in, e.g., Japanese Unexamined Patent Publication H08-177878 and Japanese Unexamined Patent Publication H11-202181.

In these conventional one-way rotational transfer mechanisms, one of opposed peripheral surfaces of the rotary input shaft and the rotary output shaft is formed as a torque transfer cylindrical surface having a circular cross section while the other peripheral surface of the rotary input shaft or the rotary output shaft is formed as a surface having a non-circular cross section to form a circumferentially-uneven-width space (accommodation space having different radial widths at different circumferential positions) between the opposed peripheral surfaces of the rotary input shaft and the rotary output shaft, so that torque transfer members (spherical members) are installed in the circumferentially-uneven-width space in a freely movable fashion. Rotating the rotary input shaft causes each torque transfer member to firstly move in the circumferentially-uneven-width space, subsequently wedge between an associated cam surface which forms a part of a circumferentially-uneven-width-space forming portion forming the aforementioned circumferentially-uneven-width space and the aforementioned torque transfer cylindrical surface, and finally transfer a torque of the rotary input shaft to the rotary output shaft.

In either of the above two patent publications, the shape of each cam surface, which forms a part of the aforementioned circumferentially-uneven-width-space forming portion, is determined so that the torque transfer member comes into contact with the associated cam surface at a predetermined point thereon when the torque transfer members come into contact with the torque transfer cylindrical surface of the rotary output shaft. However, the occurrence of dimensional errors in the cam surfaces and the torque transfer members in the production thereof cannot be avoided. Therefore, if such dimensional errors increase, each torque transfer member may come into contact with the associated cam surface at a point thereon which deviates from the predetermined point on the associated cam surface when the torque transfer members come into contact with the torque transfer cylindrical surface of the rotary output shaft; consequently, no torque can be transferred from the rotary input shaft to the rotary output shaft. Furthermore, each torque transfer member may wedge between the associated cam surface and the torque transfer cylindrical surface by an excessive force to a degree that makes it impossible for each torque transfer member to come out between the associated cam surface and the torque transfer cylindrical surface. These defects appear conspicuously especially when the one-way rotational transfer mechanism is miniaturized.

SUMMARY OF THE INVENTION

The present invention provides a rotational transfer mechanism which can reliably smoothly transfer a torque of a rotary input shaft to a rotary output shaft that are rotatable relative to each other even if dimensional errors occur in the cam surfaces, the torque transfer members and the rotary output shaft; moreover, the rotational transfer mechanism is unaffected by such dimensional errors even if miniaturized.

According to an aspect of the present invention, a rotational transfer mechanism is provided, including a hollow-cylindrical rotary output shaft having an inner peripheral surface serving as a torque transfer cylindrical surface; a rotary input shaft positioned radially inside the hollow-cylindrical rotary output shaft to be rotatable relative to the hollow-cylindrical rotary output shaft; a circumferentially-uneven-width-space forming portion which includes at least one cam surface, and is formed on the rotary input shaft to form at least one accommodation space between the rotary input shaft and the torque transfer cylindrical surface, the accommodation space having different radial widths at different circumferential positions; and at least one torque transfer member installed in the accommodation space, the torque transfer member being movable in the accommodation space in a circumferential direction to wedge between the cam surface and the torque transfer cylindrical surface to cause the rotary input shaft and the hollow-cylindrical rotary output shaft to become integral with each other in the circumferential direction when the rotary input shaft rotates relative to the hollow-cylindrical rotary output shaft, wherein the torque transfer member is circular in cross section along a plane orthogonal to a rotational axis of the rotary input shaft and the hollow-cylindrical rotary output shaft. The shape of a cross section of the cam surface along a plane orthogonal to the rotational axis is determined by defining a straight line which passes through the rotational axis and an axis of the torque transfer member which is in contact with the cam surface; defining an imaginary circle having the same cross sectional shape as the torque transfer member on the straight line at a point thereon where an axis of the imaginary circle and the axis of the torque transfer member are symmetrical with respect to the rotational axis; determining a cam-surface determining circle which circumscribes both the imaginary circle and the torque transfer member; and defining a circular arc which forms a part of the cam-surface determining circle as the cam surface.

The rotational transfer mechanism can serve as a one-way rotational transfer mechanism. The rotary input shaft includes an orthogonal surface lying on a plane orthogonal to the rotational axis. The rotational transfer mechanism includes a differential rotating member installed in the accommodation space, and pressed against the orthogonal surface by a biasing device, the differential rotating member revolving around the rotational axis in a same direction as a rotational direction of the rotary input shaft while revolving at a slower speed than a rotation of the rotary input shaft in association with the rotation of the rotary input shaft to press the torque transfer member so that the torque transfer member rotates in a direction opposite to the rotational direction of the rotary input shaft. The circumferentially-uneven-width-space forming portion is shaped so that the torque transfer member which rotates in the circumferential direction wedges between the cam surface and the torque transfer cylindrical surface to transfer a torque of the rotary input shaft to the hollow-cylindrical rotary output shaft when the rotary input shaft is rotated.

It is desirable for the torque transfer member to include a pair of torque transfer members which are positioned on opposite sides of associated the differential rotating member along the circumferential direction in a manner so as to hold the associated the differential rotating member.

The rotational transfer mechanism can serve as a one-way rotational transfer mechanism. The rotary input shaft includes an orthogonal surface lying on a plane orthogonal to the rotational axis. The circumferentially-uneven-width-space forming portion forms an annular space including the accommodation space between the rotary input shaft and the torque transfer cylindrical surface. The rotational transfer mechanism includes a differential rotating member installed in the accommodation space, and pressed against the orthogonal surface by a biasing device, the differential rotating member revolving around the rotational axis in a same direction as a rotational direction of the rotary input shaft while revolving at a slower speed than a rotation of the rotary input shaft in association with the rotation of the rotary input shaft to press the torque transfer member so that the torque transfer member rotates in a direction opposite to the rotational direction of the rotary input shaft; and a retainer installed in the annular space to retain the torque transfer member, and rotating around the rotational axis in a direction opposite to the rotational direction of the rotary input shaft when pressed by the differential rotating member. The circumferentially-uneven-width-space forming portion is shaped so that the torque transfer member, which rotates in the circumferential direction, wedges between the cam surface and the torque transfer cylindrical surface to transfer a torque of the rotary input shaft to the hollow-cylindrical rotary output shaft when the rotary input shaft is rotated.

The rotational transfer mechanism can serve as a one-way clutch, wherein the circumferentially-uneven-width-space forming portion causes the torque transfer member to wedge between the cam surface and the torque transfer cylindrical surface to transfer a torque of the rotary input shaft to the hollow-cylindrical rotary output shaft when the rotary input shaft is rotated forward, and the circumferentially-uneven-width-space forming portion prevents the torque transfer member from wedging between the cam surface and the torque transfer cylindrical surface to prevent the torque of the rotary input shaft from being transferred to the hollow-cylindrical rotary output shaft when the rotary input shaft is rotated reversely.

It is desirable for the accommodation space to include a plurality of accommodation spaces formed between the circumferentially-uneven-width-space forming portion and the torque transfer cylindrical surface of the hollow-cylindrical rotary output shaft, wherein the at least one torque transfer member is installed in each of the plurality of accommodation spaces.

It is desirable for the circumferentially-uneven-width-space forming portion to include circumferentially-uneven-depth grooves each extending in a longitudinal direction of the rotary input shaft and having different radial depths at different circumferential positions.

The torque transfer member can be a columnar member having an axis parallel to the rotational axis.

In another embodiment, a rotational transfer mechanism is provided, including a rotary output shaft having an outer peripheral surface serving as a torque transfer cylindrical surface; a hollow-cylindrical rotary input shaft positioned around the rotary output shaft to be rotatable relative to the rotary output shaft; a circumferentially-uneven-width-space forming portion which includes at least one cam surface, and is formed on the hollow-cylindrical rotary input shaft to form at least one accommodation space between the hollow-cylindrical rotary input shaft and the rotary output shaft, the accommodation space having different radial widths at different circumferential positions; and at least one torque transfer member installed in the accommodation space, and the torque transfer member being movable in the accommodation space in a circumferential direction to wedge between the cam surface and the torque transfer cylindrical surface to cause the hollow-cylindrical rotary input shaft and the rotary output shaft to become integral with each other in the circumferential direction when the hollow-cylindrical rotary input shaft rotates relative to the rotary output shaft, wherein the torque transfer member is circular in cross section along a plane orthogonal to a rotational axis of the hollow-cylindrical rotary input shaft and the rotary output shaft. The shape of a cross section of the cam surface along a plane orthogonal to the rotational axis is determined by defining a straight line which passes through the rotational axis and an axis of the torque transfer member which is in contact with the cam surface; defining an imaginary circle having the same cross sectional shape as the torque transfer member on the straight line at a point thereon where an axis of the imaginary circle and the axis of the torque transfer member are symmetrical with respect to the rotational axis; determining a cam-surface determining circle which inscribes both the imaginary circle and the torque transfer member which is in contact with the cam surface; and defining a circular arc which forms a part of the cam-surface determining circle as the cam surface.

The rotational transfer mechanism can serve as a one-way rotational transfer mechanism. The hollow-cylindrical rotary input shaft includes an orthogonal surface lying on a plane orthogonal to the rotational axis. The rotational transfer mechanism includes a differential rotating member installed in the accommodation space, and pressed against the orthogonal surface by a biasing device, the differential rotating member revolving around the rotational axis in a same direction as a rotational direction of the hollow-cylindrical rotary input shaft while revolving at a slower speed than a rotation of the hollow-cylindrical rotary input shaft in association with the rotation of the hollow-cylindrical rotary input shaft to press the torque transfer member so that the torque transfer member rotates in a direction opposite to the rotational direction of the hollow-cylindrical rotary input shaft. The circumferentially-uneven-width-space forming portion is shaped so that the torque transfer member which rotates in the circumferential direction wedges between the cam surface and the torque transfer cylindrical surface to transfer a torque of the hollow-cylindrical rotary input shaft to the rotary output shaft when the hollow-cylindrical rotary input shaft is rotated.

The torque transfer member can be a pair of torque transfer members which are positioned on opposite sides of associated the differential rotating member along the circumferential direction in a manner so as to hold the associated the differential rotating member.

The rotational transfer mechanism can serve as a one-way rotational transfer mechanism. The hollow-cylindrical rotary input shaft includes an orthogonal surface lying on a plane orthogonal to the rotational axis. The circumferentially-uneven-width-space forming portion forms an annular space including the accommodation space between the hollow-cylindrical rotary input shaft and the torque transfer cylindrical surface. The rotational transfer mechanism includes a differential rotating member installed in the accommodation space, and pressed against the orthogonal surface by a biasing device, the differential rotating member revolving around the rotational axis in a same direction as a rotational direction of the hollow-cylindrical rotary input shaft while revolving at a slower speed than a rotation of the hollow-cylindrical rotary input shaft in association with the rotation of the hollow-cylindrical rotary input shaft to press the torque transfer member so that the torque transfer member rotates in a direction opposite to a rotational direction of the hollow-cylindrical rotary input shaft; and a retainer installed in the annular space to retain the torque transfer member, and rotating around the rotational axis in a direction opposite to the rotational direction of the hollow-cylindrical rotary input shaft when pressed by the differential rotating member. The circumferentially-uneven-width-space forming portion is shaped so that the torque transfer member which rotates in the circumferential direction wedges between the cam surface and the torque transfer cylindrical surface to transfer a torque of the hollow-cylindrical rotary input shaft to the rotary output shaft when the hollow-cylindrical rotary input shaft is rotated.

The rotational transfer mechanism can serve as a one-way clutch, wherein the circumferentially-uneven-width-space forming portion causes the torque transfer member to wedge between the cam surface and the torque transfer cylindrical surface to transfer a torque of the hollow-cylindrical rotary input shaft to the rotary output shaft when the hollow-cylindrical rotary input shaft is rotated forward, and the circumferentially-uneven-width-space forming portion prevents the torque transfer member from wedging between the cam surface and the torque transfer cylindrical surface to prevent the torque of the hollow-cylindrical rotary input shaft from being transferred to the rotary output shaft when the hollow-cylindrical rotary input shaft is rotated reversely.

The accommodation space can be a plurality of accommodation spaces formed between the circumferentially-uneven-width-space forming portion and the torque transfer cylindrical surface of the rotary output shaft, wherein the at least one torque transfer member is installed in each of the plurality of accommodation spaces.

The circumferentially-uneven-width-space forming portion can include circumferentially-uneven-depth grooves each extending in a longitudinal direction of the hollow-cylindrical rotary input shaft and having different radial depths at different circumferential positions.

The torque transfer member can be a columnar member having an axis parallel to the rotational axis.

The biasing device can be a compression coil spring.

The differential member can be a columnar member having an axis extending in a radial direction of the rotary input shaft.

The differential member can be a columnar member having an axis extending in a radial direction of the hollow-cylindrical rotary input shaft.

It is desirable for a diameter of the cam-surface determining circle is determined by an angle between a first tangential line tangent to the cam surface at a point thereon where the torque transfer member is in contact with the cam surface and a second tangential line tangent to the torque transfer cylindrical surface at a point thereon where the torque transfer member is in contact with the torque transfer cylindrical surface.

According to the present invention, a torque of the rotary input shaft can be reliably smoothly transferred to the rotary output shaft even if dimensional errors occur in the cam surfaces, the torque transfer members and the rotary output shaft; moreover, the rotational transfer mechanism is unaffected by such dimensional errors even if miniaturized, which makes it possible to transfer a torque of the rotary input shaft to the rotary output shaft smoothly with reliability.

The present disclosure relates to subject matter contained in Japanese Patent Application No. 2003-365594 (filed on Oct. 27, 2003) which is expressly incorporated herein by reference in its entirety.

BRIEF DESCRIPTION OF THE DRAWINGS

The present invention will be described below in detail with reference to the accompanying drawings in which:

FIG. 4 is a view similar to that of FIG. 3, showing a state where an engageable roller is in contact with an associated cam surface on the rotary input shaft at a point thereon that deviates from a predetermined point on the associated cam surface;

DESCRIPTION OF THE PREFERRED EMBODIMENTS

Figure 1:
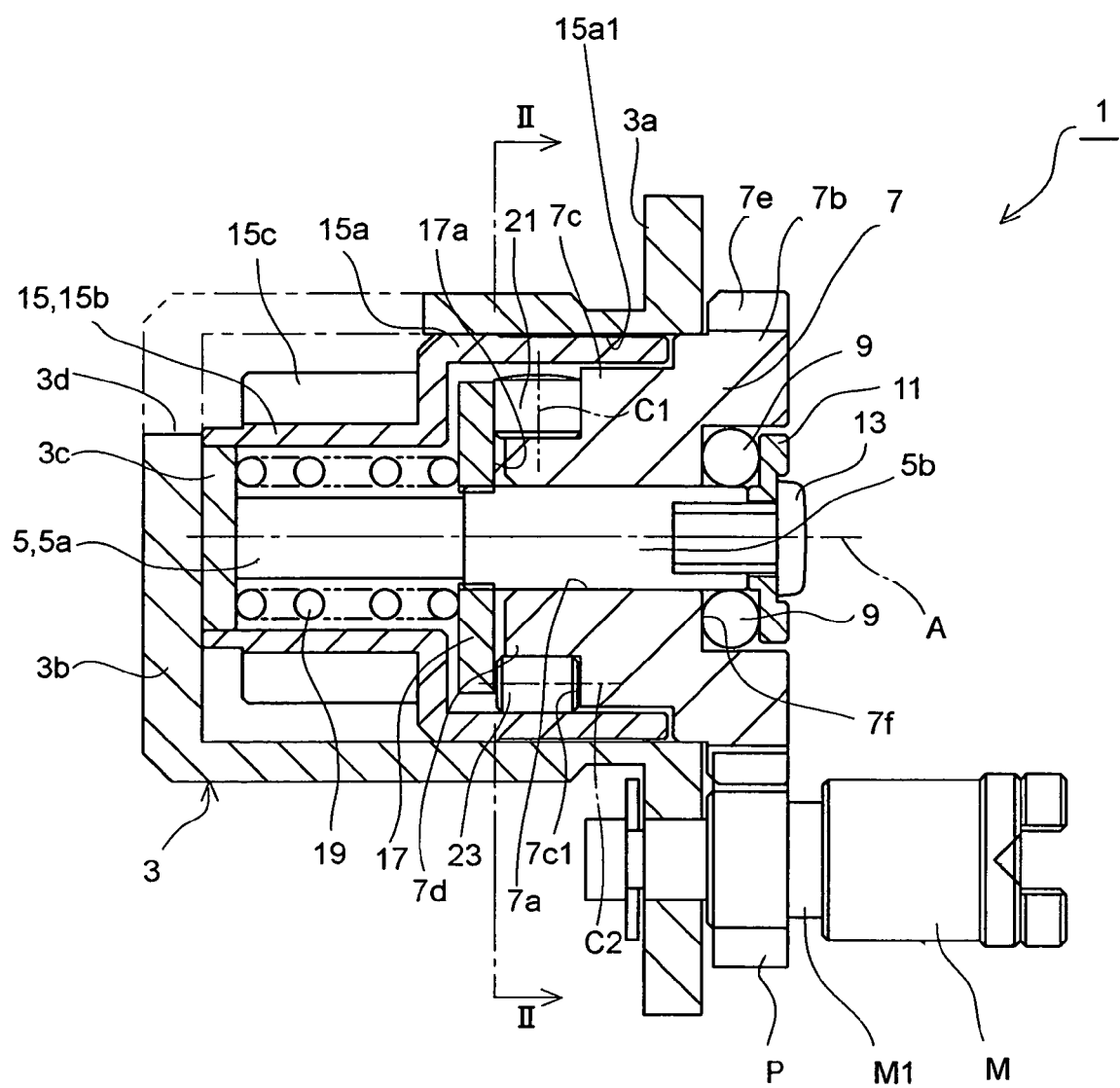
FIG. 1 is a longitudinal cross sectional view of a first embodiment of a one-way rotational transfer mechanism according to the present invention.

FIGS. 1 and 4 show a first embodiment of the one-way rotational transfer mechanism (torque transfer mechanism) according to the present invention. This embodiment of the one-way rotational transfer mechanism 1 is incorporated in an autofocus camera in which a photographing mode can be selected between an autofocus mode (AF mode) and a manual focus mode (MF mode). Firstly, the structure of the one-way rotational transfer mechanism 1 will be discussed hereinafter.

In the following descriptions, the front and rear of the one-way rotational transfer mechanism 1 correspond to left and right sides in FIG. 1, respectively. The one-way rotational transfer mechanism 1 is provided with a cylindrical housing 3 whose front and rear ends are formed as a closed end and an open end, respectively. The cylindrical housing 3 is provided at a rear end thereof with an annular flange 3a which is fixed to a camera body (not shown) by set screws (not shown) to be positioned inside the camera body. The cylindrical housing 3 is provided at a front end thereof with a front wall 3b, and a disc plate 3c is fixed to a rear surface of the front wall 3b at the center thereof. The one-way rotational transfer mechanism 1 is provided radially inside the housing 3 with a rotational shaft (stationary shaft) 5 which is positioned coaxially with the axis of the housing 3. A front surface of the rotational shaft 5 is fixed to a rear surface of the disc plate 3c. The rotational shaft 5 consists of a front small-diameter portion 5a and a rear large-diameter portion 5b. In the case where the one-way rotational transfer mechanism 1 is incorporated in a camera, a rotational axis A of the rotational shaft 5 is parallel to an optical axis of a photographing lens of the camera.

Figure 2:
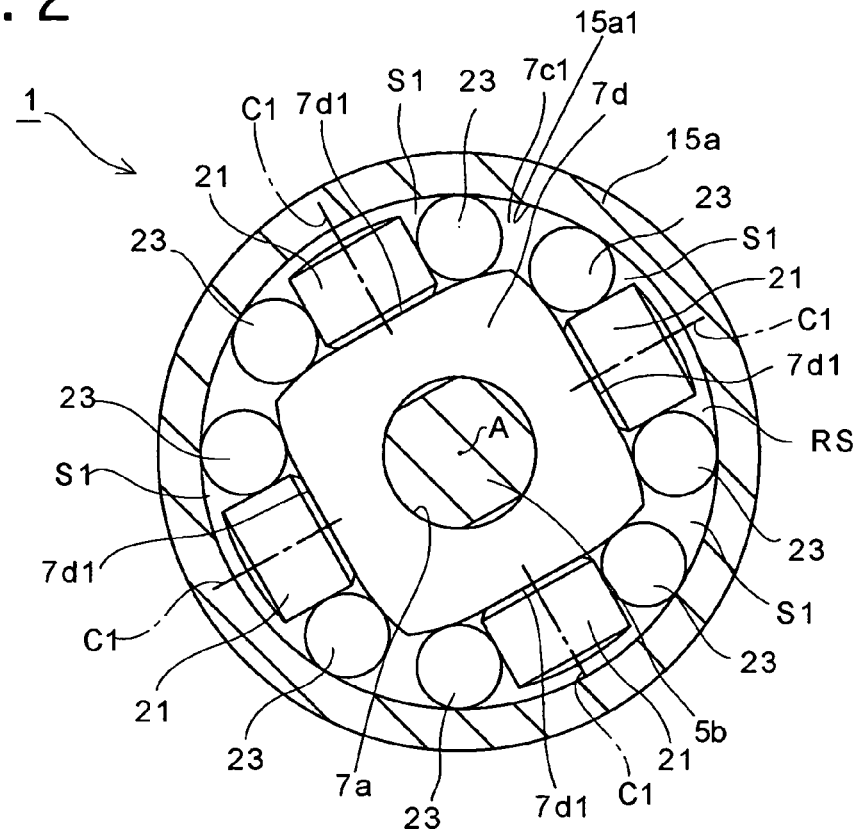
FIG. 2 is a cross sectional view taken along II—II line shown in FIG. 1.

The one-way rotational transfer mechanism 1 is provided on the large-diameter portion 5b of the rotational shaft 5 with a hollow-cylindrical rotary input shaft 7 having a central hole 7a so that the cylindrical rotary input shaft 7 is freely rotatable on the large-diameter portion 5b of the rotational shaft 5. As shown in FIG. 1, the rotary input shaft 7 is formed so that a diameter thereof increases in three steps in a direction toward the rear of the rotary input shaft 7. Specifically, the rotary input shaft 7 is provided with a large-diameter portion 7b, an intermediate-diameter portion 7c and a small-diameter portion (portion having a non-circular cross section) 7d in that order from the rear end to the front end of the rotary input shaft 7, so that a front surface of the intermediate-diameter portion 7c is formed as an axially-orthogonal surface 7c1 (viewed as an annular surface from the front of the rotary input shaft 7) which lies in a plane orthogonal to the rotational axis A. The small-diameter portion 7d serves as a circumferentially-uneven-width-space forming portion. Each of the large-diameter portion 7b and the intermediate-diameter portion 7c has a circular cross section, whereas the small-diameter portion 7d has a substantially square cross section as shown in FIG. 2. The large-diameter portion 7b is provided on an outer peripheral surface thereof with an input gear 7e.

A front portion of the rotary input shaft 7 in front of the input gear 7e is accommodated in the housing 3. The rotary input shaft 7 is provided, on a rear end surface thereof at the center of this rear end surface, with an annular recess 7f, while a plurality of steel balls 9 for ball bearing are positioned circumferentially in the annular recess 7f. A stop ring 11 having a diameter substantially the same as the diameter of the annular recess 7f is fixed to the rear end surface of the rotational shaft 5 by a set screw 13 to prevent the rotary input shaft 7 from moving rearward beyond the position thereof shown in FIG. 1 by engagement of each steel ball 9 with the stop ring 11.

An AF motor (reversible motor) M is fixed to the annular flange 3a of the housing 3 so that a pinion P fixed on a rotary shaft M1 of the AF motor M is in mesh with the input gear 7e of the rotary input shaft 7.

The one-way rotational transfer mechanism 1 is provided inside the housing 3 with a hollow-cylindrical rotary output shaft 15 whose front and rear ends are each formed as an open end. The rotary output shaft 15 is rotatable about the rotational shaft 5. The rotary output shaft 15 is formed so that a diameter thereof increases in two steps in a direction toward the rear of the rotary output shaft 15. Specifically, the rotary output shaft 15 is provided with a large-diameter portion 15a and a small-diameter portion 15b, in that order from the rear end to the front end of the rotary output shaft 15. A rear end portion of the large-diameter portion 15a is fitted in the annular space formed between an inner peripheral surface of the housing 3 and an outer peripheral surface of the intermediate-diameter portion 7c of the rotary input shaft 7 so that the large-diameter portion 15a is rotatable about the rotational shaft 5, while a front end portion of the small-diameter portion 15b is fitted on an outer peripheral surface of the disc plate 3c so that the small-diameter portion 15b is rotatable on the disc plate 3c. The small-diameter portion 15b is provided on its entire outer peripheral surface with an output gear 15c which is exposed to the outside of the housing 3 via an opening 3d formed on a front end portion of the housing 3. Upon an interchangeable lens (not shown) being mounted to a camera body of the camera incorporating the one-way rotational transfer mechanism 1, an input gear of a focusing mechanism provided in the interchangeable lens is engaged with the output gear 15c through the opening 3d of the housing 3.

An annular member 17 is fitted on the rear large-diameter portion 5b of the rotational shaft 5 to be positioned in front of the rotary input shaft 7. A compression coil spring (biasing device) 19 is installed in a compressed state between a front surface of the annular member 17 and a rear surface of the disc plate 3c. The annular member 17 is continuously biased rearward by the spring force of the compression coil spring 19.

As shown in FIG. 2, an accommodation space (circumferentially-uneven-width space) S1 having different radial widths at different circumferential positions is formed between an inner peripheral surface (torque transfer cylindrical surface) 15a1 (the inner peripheral surface 15a1 being centered about the rotational axis A) of the large-diameter portion 15a and each of four side surfaces (accommodation-space forming surfaces) 7d1 of the small-diameter portion 7d. In other words, an annular space RS which is formed between the small-diameter portion 7d and the inner peripheral surface 15a1 of the large-diameter portion 15a, as viewed from the front of the one-way rotational transfer mechanism 1, is divided into four to form the four accommodation spaces S1.

A differential roller (differential rotating member) 21 having a substantially columnar shape is installed in each of the four accommodation spaces S1 so that an axis C1 of the differential roller 21 extends in a radial direction of the rotary input shaft 7. Each differential roller 21 is loosely fitted in between the associated side surface 7d1 and the inner peripheral surface 15a1, while the axially-orthogonal surface 7c1 of the rotary input shaft 7 and a pressing surface 17a, which lies on a plane orthogonal to the rotational axis A, serving as a rear surface of the annular member 17 are in contact with peripheral surfaces of each differential roller 21 at opposite sides thereof so that the differential roller 21 is held between the axially-orthogonal surface 7c1 and the pressing surface 17a.

Additionally, a pair of engageable rollers (torque transfer members) 23 are installed in each accommodation space S1 on opposite sides of the associated differential roller 21 as viewed from the front of the one-way rotational transfer mechanism 1 in a manner so as to hold the differential roller 21 between the pair of engageable rollers 23. Each engageable roller 23 has a substantially columnar shape, and an axis C2 of each engageable roller 23 extends in a direction parallel to the rotational axis A. Each engageable roller 23 is movable in the associated accommodation space S1 in a circumferential direction about the rotational axis A. In addition, each engageable roller 23 is movable in the direction of the axis C2 with respect to the annular member 17 and the rotary input shaft 7 because the length of each engageable roller 23 in the direction of the axis C2 thereof is shorter than the diameter of each differential roller 21 about the axis C1 and because each engageable roller 23 does not undergo any biasing force from the annular member 17.

Figure 3:
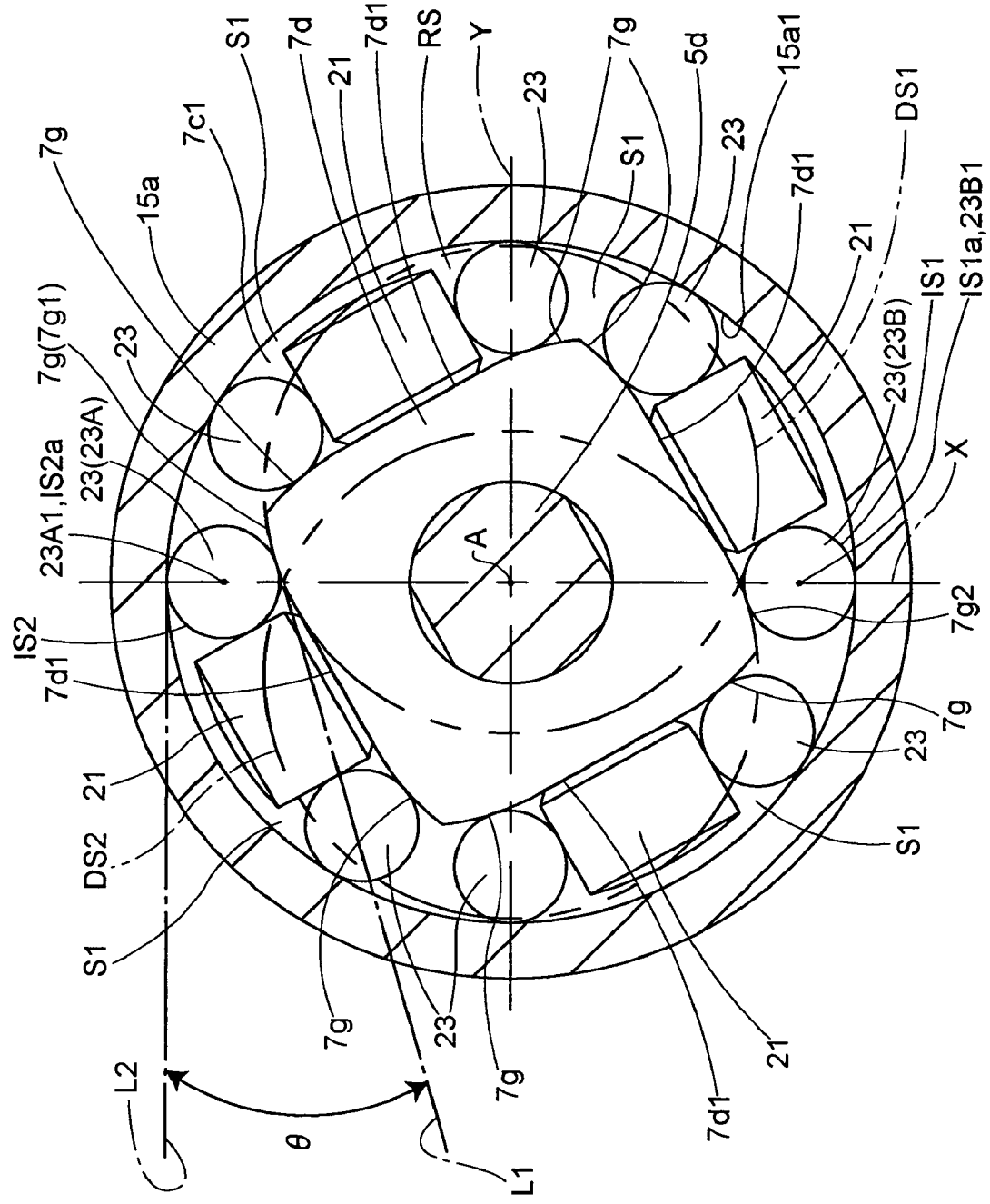
FIG. 3 is an enlarged view of FIG. 2, illustrating the shape of each cam surface formed on an outer peripheral surface of a rotary input shaft.

Although the small-diameter portion 7d has a substantially square cross section as shown in FIGS. 2 through 4 as noted above, each side surface 7d1 of the small-diameter portion 7d is not straight in cross section. As can be seen from the magnified views shown in FIGS. 3 and 4, each side surface 7d1 is provided on opposite ends thereof with two cam surfaces 7g, respectively, each of which has a circular-arc-shaped cross section. Accordingly, a total of eight cam surfaces 7g are formed on the small-diameter portion 7d.

The shape of each cam surface 7g is determined in a manner which will be discussed hereinafter.

Firstly, a manner of determining the shape of the cam surface 7g1 (7g) with which the peripheral surface of the top engageable roller 23A(23) as viewed in FIG. 3 is in contact will be discussed hereinafter.

In FIG. 3, a straight line which passes through both an axis 23A1 of the engageable roller 23A (23) and the rotational axis A of the rotational shaft 5 is defined as a straight line X, and an axis IS1a of an imaginary circle IS1 having the same cross sectional shape as the engageable roller 23A (23) is positioned on the straight line X at a point thereon where the axis IS1a of the imaginary circle IS1 and the axis 23A1 of the engageable roller 23A (23) are symmetrical with respect to the rotational axis A of the rotational shaft 5. Note that the outline (perimeter) of the bottom engageable roller 23B (23) as viewed in FIG. 3 is coincident with the imaginary circle IS1. In addition, a cam-surface determining circle DS1 which inscribes both an outer peripheral surface of the engageable roller 23A (23) and the imaginary circle IS1 (i.e., an outer peripheral surface of the engageable roller 23B (23)) is defined as shown by a two-dot chain line in FIG. 3, and the shape of the cam surface 7g1 (7g) is determined so that a cross sectional shape of the cam surface 7g1 (7g), with which the peripheral surface of the top engageable roller 23A(23) as viewed in FIG. 3 is in contact, coincides with a circular arc which forms a part of the cam-surface determining circle DS1.

The diameter of the cam-surface determining circle DS1 is determined by an angle (wedge angle) θ between a tangential line L1 tangent to the cam surface 7g1 (7g) at a point thereon where the engageable roller 23A (23) is in contact with the cam surface 7g1 (7g) and a tangential line L2 tangent to the inner peripheral surface 15a1 of the large-diameter portion 15a at a point thereon where the engageable roller 23A (23) is in contact with the inner peripheral surface 15a1. Namely, the diameter of the cam-surface determining circle DS1 becomes smaller as the wedge angle θ is reduced, while the diameter of the cam-surface determining circle DS1 becomes greater as the wedge angle θ is increased. Even if the diameter of the cam-surface determining circle DS1 is changed by changing the wedge angle θ, the center of the cam-surface determining circle DS1 reliably lies on a straight line Y which is orthogonal to the straight line X and which passes through the rotational axis A.

Secondly, a manner of determining the shape of a cam surface 7g2 (7g) with which the peripheral surface of the bottom engageable roller 23B(23) as viewed in FIG. 3 is in contact will be discussed hereinafter.

An axis IS2a of an imaginary circle IS2 having the same cross sectional shape as the engageable roller 23B (23) is positioned on the straight line X at a point thereon where the axis IS2a of the imaginary circle IS2 and the axis 23B1 of the engageable roller 23B (23) are symmetrical with respect to the rotational axis A of the rotational shaft 5. Note that the outline (perimeter) of the top engageable roller 23A (23) as viewed in FIG. 3 is coincident with the imaginary circle IS2, and the axis 23A1 is coincident with the axis IS2a. In addition, a cam-surface determining circle DS2 which inscribes both an outer peripheral surface of the engageable roller 23B (23) and the imaginary circle IS2 (i.e., an outer peripheral surface of the engageable roller 23A (23)) is defined as shown by a two-dot chain line in FIG. 3, and the shape of the cam surface 7g2 (7g) is determined so that a cross sectional shape of the cam surface 7g2 (7g), with which the peripheral surface of the bottom engageable roller 23B(23) as viewed in FIG. 3 is in contact, coincides with a circular arc which forms a part of the cam-surface determining circle DS2.

The shape of each of the remaining cam surfaces 7g is determined in the same manner. Namely, a straight line which passes through both an axis of the engageable roller 23 that is in contact with the cam surface 7g and the rotational axis A of the rotational shaft 5 is defined as a straight line (not shown), while an axis of an imaginary circle (not shown; the outline (perimeter) of one of the remaining engageable rollers 23 is coincident with this imaginary circle) is positioned on the straight line at a point thereon where the axis of the imaginary circle and the axis of the aforementioned engageable roller 23 that is in contact with the cam surface 7g are symmetrical with respect to the rotational axis A of the rotational shaft 5. In addition, a cam-surface determining circle (not shown) which inscribes both an outer peripheral surface of the engageable roller 23 and the imaginary circle is defined, and the shape of the cam surface 7g is determined so that a cross sectional shape of the cam surface 7g coincides with a circular arc which forms a part of the cam-surface determining circle.

Operations of the one-way rotational transfer mechanism 1 having the above described structure will be discussed hereinafter.

Firstly, operations of the one-way rotational transfer mechanism 1 when a focusing operation is performed in autofocus mode will be hereinafter discussed.

Immediately after a control circuit (not shown) provided in the camera body outputs a forward-rotation drive signal to the AF motor M to rotate the AF motor M in a forward direction, a forward rotation of the AF motor M is transferred to the rotary input shaft 7 via the engagement of the pinion P with the input gear 7e, so that the rotary input shaft 7 rotates counterclockwise as viewed in FIG. 2. Thereupon, each differential roller 21 that is held between the pressing surface 17a of the annular member 17 and the axially-orthogonal surface 7c1 of the rotary input shaft 7 revolves (rotates) around the rotational axis A in the same rotational direction (counterclockwise direction) as the rotary input shaft 7 while rotating about the axis C1 of the differential roller 21 in the associated accommodation space S1. During this movement of each differential roller 21, provided that no slip occurs either between each differential roller 21 and the pressing surface 17a or between each differential roller 21 and the axially-orthogonal surface 7c1, the rotational speed of each differential roller 21 around the rotational axis A is half the rotational speed of the rotary input shaft 7. As a result, each differential roller 21 rotates clockwise relative to the rotary input shaft 7. Therefore, each differential roller 21 comes in contact With one of the associated pair of engageable rollers 23 which is positioned on the clockwise side, and subsequently biases this engageable roller 23 so that it rotates clockwise. This engageable roller 23 rotates clockwise in the associated accommodation space S1 to firmly wedge into one of the wedge-shaped (radially-narrowed) circumferentially opposite end portions of the associated accommodation space S1 which is positioned on the clockwise side in the accommodation space S1 between the associated side surface 7d1 of the small-diameter portion 7d and the inner peripheral surface 15a1 of the large-diameter portion 15a. This causes the small-diameter portion 7d (the rotary input shaft 7) and the rotary output shaft 15 to become integral with each other circumferentially via the wedged engageable rollers 23 so that the rotation of the small-diameter portion 7d is transferred to the rotary output shaft 15 to rotate the rotary output shaft 15 counterclockwise. Thereupon, this rotation of the rotary output shaft 15 is transferred to the aforementioned focusing mechanism, which is provided in the interchangeable lens, via the output gear 15c to move a focusing lens group (not shown) forward along the photographing optical axis.

On the other hand, if the control circuit in the camera body outputs a reverse-rotation drive signal to the AF motor M to rotate the AF motor M in reverse direction, a reverse rotation of the AF motor M is transferred to the rotary input shaft 7 via the engagement of the pinion P with the input gear 7e, so that the rotary input shaft 7 rotates clockwise as viewed in FIG. 2. Thereupon, each differential roller 21 revolves (rotates) around the rotational axis A in the same rotational direction (clockwise direction) as the rotary input shaft 7 at a rotational speed half the rotational speed of the rotary input shaft 7 while rotating on the axis C1 of the differential roller 21. As a result, each differential roller 21 rotates counterclockwise relative to the rotary input shaft 7. Therefore, each differential roller 21 comes in contact with the other of the associated pair of engageable rollers 23 that is positioned on the counterclockwise side, and subsequently biases this engageable roller 23 so that it rotates counterclockwise. This engageable roller 23 rotates counterclockwise in the associated accommodation space S1 to firmly wedge into the other of the wedge-shaped (radially-narrowed) circumferentially opposite end portions of the associated accommodation space S1, which is positioned on the counterclockwise side in associated accommodation space S1 between the associated side surface 7d1 of the small-diameter portion 7d and the inner peripheral surface 15a1 of the large-diameter portion 15a. This causes the small-diameter portion 7d (the rotary input shaft 7) and the rotary output shaft 15 to become integral with each other circumferentially via the wedged engageable rollers 23, so that the rotation of the small-diameter portion 7d is transferred to the rotary output shaft 15 to rotate the rotary output shaft 15 clockwise. Thereupon, this rotation of the rotary output shaft 15 is transferred to the aforementioned focusing mechanism provided in the interchangeable lens to move the focusing lens group rearward along the photographing optical axis.

In this manner the control circuit makes the AF motor M rotate in forward and reverse directions to move the focusing lens forward and rearward to perform an autofocusing operation.

Immediately after an in-focus state is obtained by the autofocusing operation, the control circuit sends a control signal to the AF motor M to rotate the AF motor M in a rotational direction opposite to the previous rotational direction of the AF motor M by an angle of rotation smaller than backlash between the pinion P and the input gear 7e. Thereupon, the rotary input shaft 7 rotates in a rotational direction opposite to the previous rotational direction, in which the rotary input shaft 7 rotates immediately before the aforementioned in-focus state is obtained, without rotating the rotary output shaft 15 to thereby reduce the contacting force of each engageable roller 23 with each of the associated side surface 7d1 of the small-diameter portion 7d and the inner peripheral surface 15a1 of the large-diameter portion 15a. This reduction of such a contacting force allows a manual focus ring (not shown) of the interchangeable lens to be rotated smoothly.

Operations of the one-way rotational transfer mechanism 1 when a focusing operation is performed in manual focus mode will be hereinafter discussed.

In a state shown in FIG. 2, if the manual focus ring of the interchangeable lens is manually rotated in a forward or reverse rotational direction with no actuation of the AF motor M, this forward or reverse rotation of the manual focus ring is transferred to the focusing mechanism provided in the interchangeable lens to perform a focusing operation (MF operation).

Immediately after the rotation of the manual focus ring is transferred to the focusing mechanism, rotational force is transferred from the focusing ring to the output gear 15c of the rotary output shaft 15. Thereafter, the rotary output shaft 15 rotates clockwise or counterclockwise about the rotational shaft 5, whereas no rotation is transferred from the rotary output shaft 15 to either each engageable roller 23 or each differential roller 21 since the inner peripheral surface (torque transfer cylindrical surface) 15a1 of the rotary output shaft 15 has a circular shape as viewed from the front of the one-way rotational transfer mechanism 1. Therefore, rotation of the rotary output shaft 15 does not cause the small-diameter portion 7d (the rotary input shaft 7) to rotate, thus applying no load on the AF motor M.

As can be understood from the above descriptions, according to the above described embodiment of the one-way rotational transfer mechanism, the one-way rotational transfer mechanism 1 having a simple structure in which the rotary output shaft 15 rotates when the rotary input shaft 7 is rotated and in which the rotary input shaft 7 does not rotate when the rotary output shaft 15 is rotated is achieved.

In an autofocusing operation, a torque of the rotary input shaft 7 is transferred to the rotary output shaft 15 with each engageable roller 23 contacting with the associated cam surface 7g. During the transferring of torque from the rotary input shaft 7 to the rotary output shaft 15, each engageable roller 23 causes the rotary input shaft 7 and the rotary output shaft 15 to become integral with each other circumferentially to thereby transfer a torque from the rotary input shaft 7 to the rotary output shaft 15 smoothly and reliably even if each engageable roller 23 (only the engageable roller 23A (23) is shown by one-dot chain line in FIG. 4) comes in contact with the associated cam surface 7g at a point thereon which deviates (due to dimensional errors in the cam surfaces 7g, the engageable rollers 23, and the rotary output shaft 15) from a predetermined point on the associated cam surface 7g when coming into contact with the inner peripheral surface 15a1 of the large-diameter portion 15a since the shape of each cam surface 7g is determined in the above described manner. Moreover, even if each engageable roller 23 comes in contact with the associated cam surface 7g at a point thereon which deviates from a predetermined point on the associated cam surface 7g, the contacting force of each engageable roller 23 with each of the associated cam surface 7g and the inner peripheral surface 15a1 of the large-diameter portion 15a does not become excessively large.

Additionally, if the one-way rotational transfer mechanism 1 is applied between a camera body incorporating an AF motor and an interchangeable lens having a manual focus ring in the above described manner, a photographing state can be switched between AF mode and MF mode without the need for any switch for switching a photographing state between AF mode and MF mode. Moreover, the autofocusing operation is performed smoothly even if the user touches the manual focus ring during the autofocusing operation since the manual focus ring does not rotate at the autofocusing operation.

A torque can be reliably transferred from the rotary input shaft 7 to the rotary output shaft 15 because each differential roller 21 is made to revolve (rotate) around the rotary input shaft 7 in the same rotational direction as the rotary input shaft 7 while trailing behind the rotation of the rotary input shaft 7, and subsequently, because each engageable roller 23 is made to wedge firmly between the associated side surface 7d1 of the small-diameter portion 7d and the inner peripheral surface 15a1 of the large-diameter portion 15a to serve as a torque transfer member.

Moreover, since each engageable roller 23 is formed as a cylindrical member, the axis of which is parallel to the rotational axis A of the rotational shaft 5, each engageable roller 23 that serves as a torque transfer member is in contact with each of the rotary input shaft 7 and the rotary output shaft 15 on a contact area greater than that in the case where the torque transfer member is formed in a spherical member. Therefore, the efficiency of transferring torque from the rotary input shaft 7 to the rotary output shaft 15 in the present embodiment of the one-way rotational transfer mechanism 1 is higher than that in the case where each torque transfer member is formed in a spherical member.

The number of the differential rollers 21 or the engageable rollers 23 which are accommodated in each accommodation space S1 can be changed by changing a cross sectional shape of the small-diameter portion 7d to a regular polygonal shape other than a square shape such as a regular triangular shape or a regular pentagonal shape, or by forming the small-diameter portion 7d to have a non-circular cross section so as to include at least one surface orthogonal to a radial direction of the rotary input shaft 7. With a change in the number of the differential rollers 21 or the engageable rollers 23, the efficiency of transferring torque from the rotary input shaft 7 to the rotary output shaft 15 can be adjusted. In also this case, each cam surface 7g is determined in the above described manner.

Figure 5:
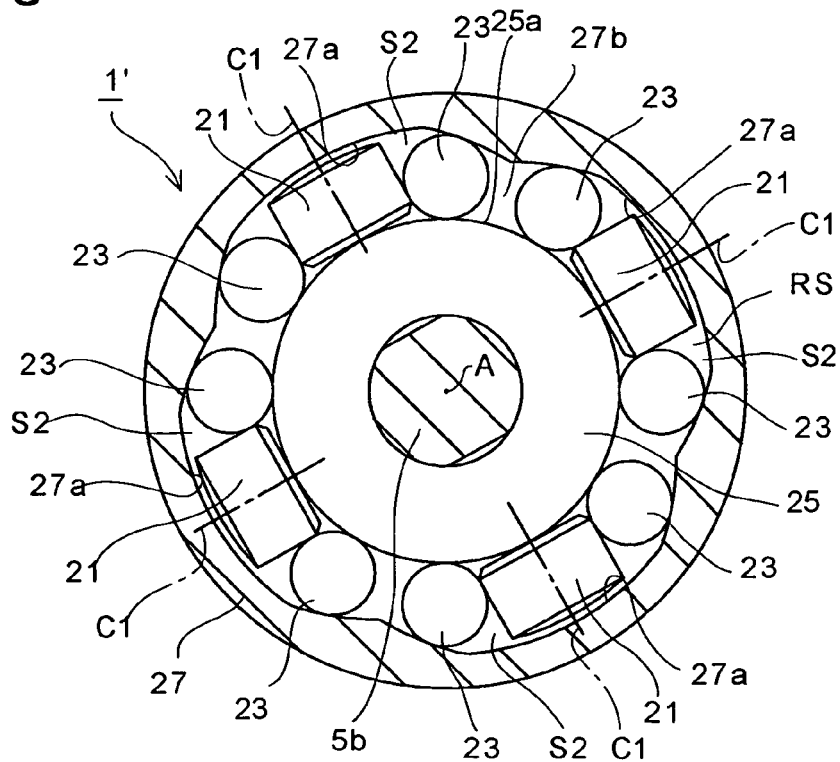
FIG. 5 is a view similar to that of FIG. 2, showing a modification of the first embodiment of the one-way rotational transfer mechanism.
Figure 6:
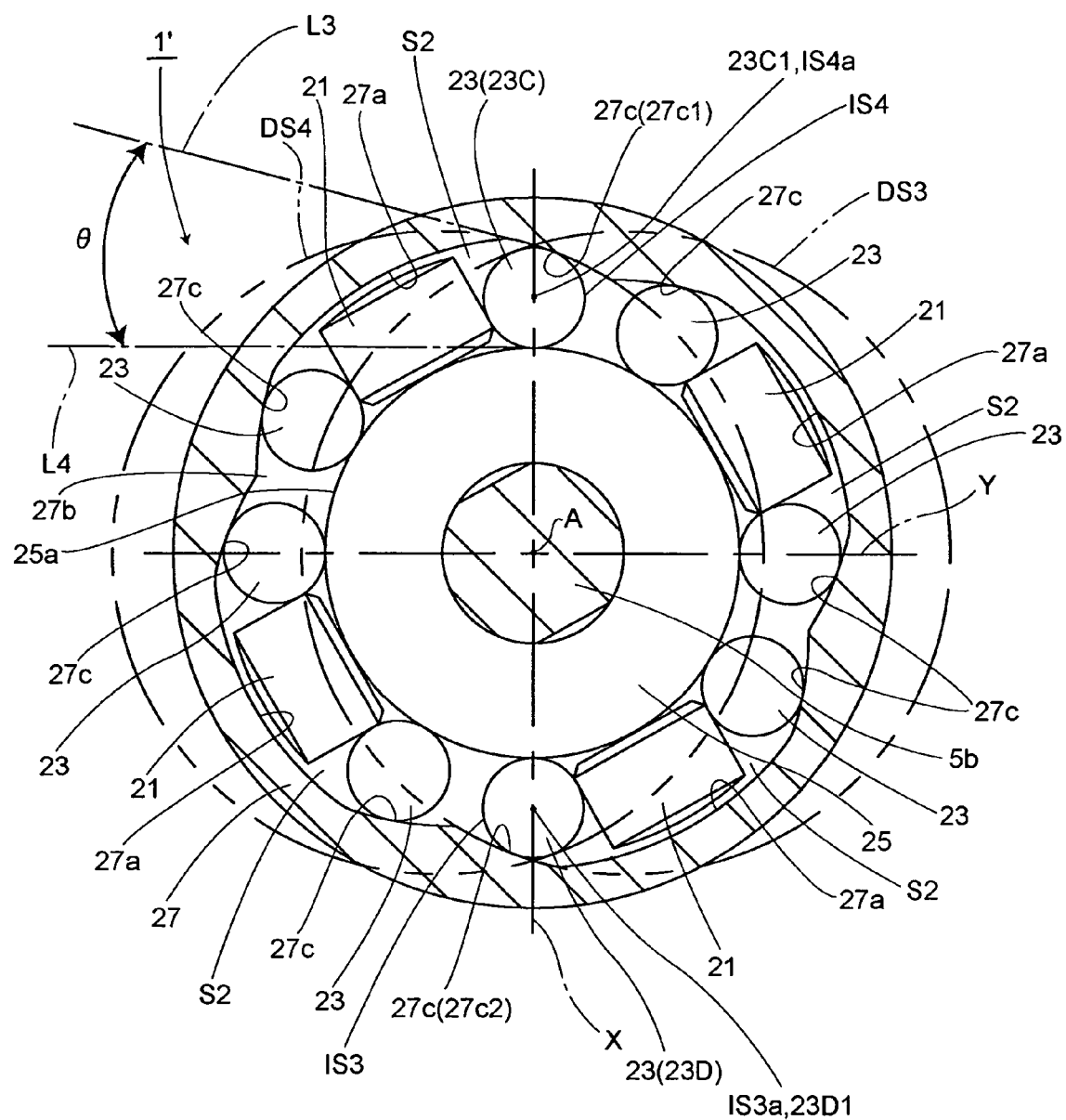
FIG. 6 is an enlarged view of FIG. 5, illustrating the shape of each cam surface formed on an inner peripheral surface of a rotary input shaft.
Figure 7:
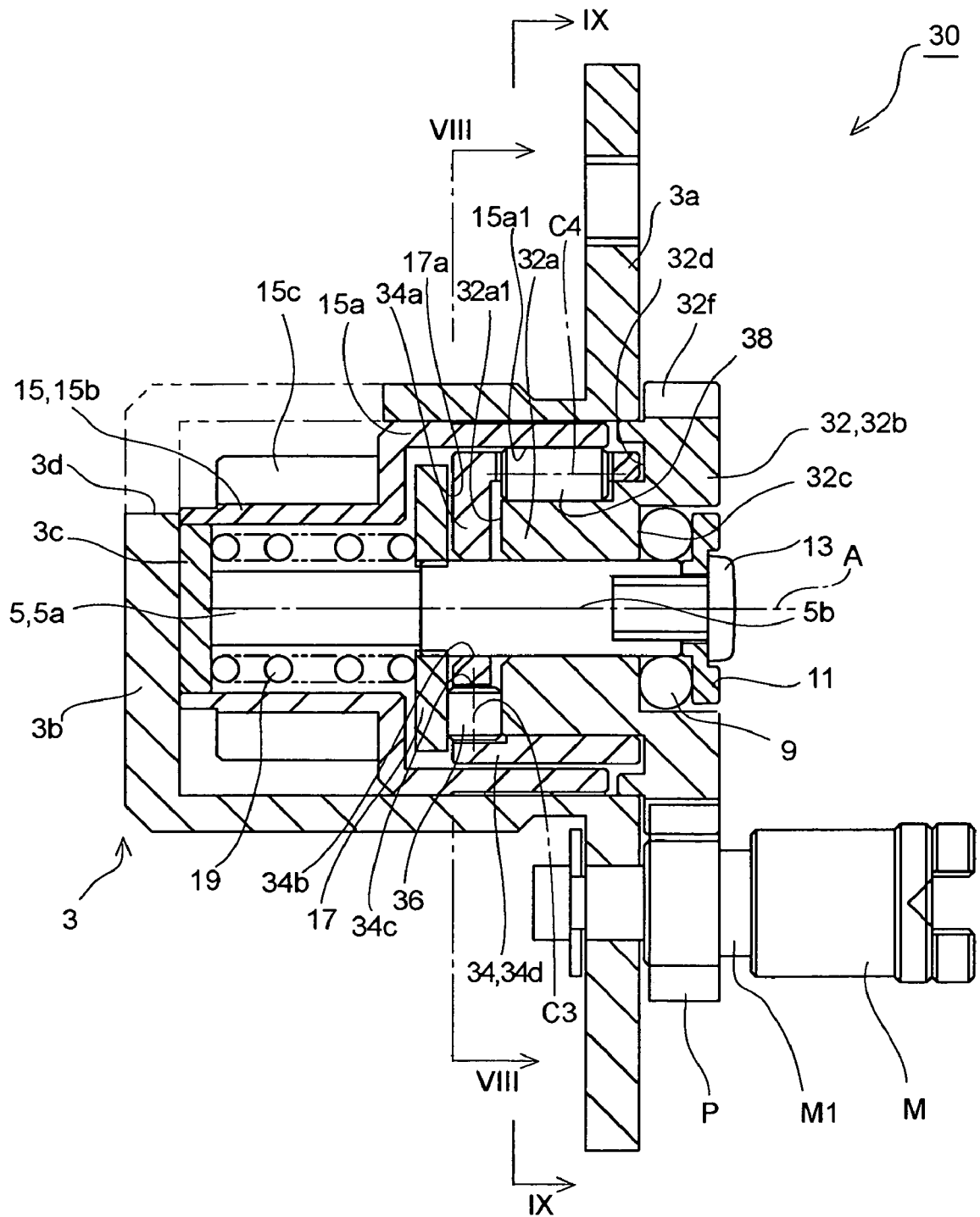
FIG. 7 is a longitudinal cross sectional view of a second embodiment of the one-way rotational transfer mechanism according to the present invention.

FIGS. 5 and 6 show a modification of the first embodiment of the one-way rotational transfer mechanism, in which a rotary input shaft and a rotary output shaft are positioned in a radially reversed fashion; namely, a rotary input shaft 27 is positioned radially outside a hollow-cylindrical rotary output shaft 25.

In the one-way rotational transfer mechanism (torque transfer mechanism) 1' shown in FIGS. 5 and 6, the rotary output shaft 25, whose outer peripheral surface (torque transfer cylindrical surface) 25a is circular in cross section and is centered about the rotational axis A, is fitted on the large-diameter portion 5b of the rotational shaft 5 to be rotatable about the rotational axis A, while the hollow-cylindrical rotary input shaft 27 is positioned radially outside the rotary output shaft 25 to be rotatable about the rotational axis A. The rotary input shaft 27 is provided, on an inner peripheral surface thereof at equi-angular intervals in a circumferential direction of the rotary input shaft 27, with four circumferentially-uneven-depth grooves (circumferentially-uneven-width-space forming portions) 27a which have different radial depths at different circumferential positions. The one-way rotational transfer mechanism 1' is provided, between opposed surfaces of each circumferentially-uneven-depth groove 27a and an outer peripheral surface 25a of the rotary output shaft 25, with an accommodation space (circumferentially-uneven-width space) S2 having different radial widths at different circumferential positions. In other words, an annular space RS which is formed between the rotary output shaft 25 and the rotary input shaft 27 is divided into four to form the four accommodation spaces S2.

The rotary input shaft 27 is provided with an axially-orthogonal surface 27b which lies in a plane orthogonal to the rotational axis A. The annular member 17 that is continuously biased rearward by the spring force of the compression coil spring 19 is fitted on the rear large-diameter portion 5b to be positioned in front of the four accommodation spaces S2 (neither the annular member nor the compression coil spring 19 is shown in FIGS. 5 and 6). As shown in FIGS. 5 and 6, a differential roller 21 is installed in each of the four accommodation spaces S2 to be held between the pressing surface 17a of the annular member 17 and the axially-orthogonal surface 27b of the rotary input shaft 27 at all times. Additionally, a pair of engageable rollers 23 are installed in each accommodation space S2 on opposite sides of the associated differential roller 21 to be movable in the associated accommodation space S2 in a circumferential direction about the rotational axis A while holding the differential roller 21 between the pair of engageable rollers 23.

The rotary input shaft 27 is provided with an input gear (not shown) which is in mesh with the pinion P of the AF motor M, while the rotary output shaft 25 is provided with an output gear (not shown) which is in mesh with the aforementioned input gear of the focusing mechanism provided in the interchangeable lens.

As shown in FIG. 6, each circumferentially-uneven-depth groove 27a is provided on circumferentially opposite ends thereof with two cam surfaces 27c, respectively. The shape of each cam surface 27c is determined in a manner which will be discussed hereinafter.

Firstly, a manner of determining the shape of the cam surface 27c1 (27c) with which the peripheral surface of a top engageable roller 23C(23) as viewed in FIG. 6 is in contact will be discussed hereinafter.

In FIG. 6, a straight line which passes through both an axis 23C1 of the engageable roller 23C (23) and the rotational axis A of the rotational shaft 5 is defined as a straight line X, while an axis IS3a of an imaginary circle IS3 having the same cross sectional shape as the engageable roller 23C (23) is positioned on the straight line x at a point thereon where the axis IS3a of the imaginary circle IS3 and the axis 23C1 of the engageable roller 23C (23) are symmetrical with respect to the rotational axis A of the rotational shaft 5. Note that the outline (perimeter) of the bottom engageable roller 23D (23) as viewed in FIG. 6 is coincident with the imaginary circle IS3. In addition, a cam-surface determining circle DS4 which circumscribes both an outer peripheral surface of the engageable roller 23C (23) and the imaginary circle IS3 (i.e., an outer peripheral surface of the engageable roller 23D (23)) is defined as shown by a two-dot chain line in FIG. 6, and the shape of the cam surface 27c1 (27c) is determined so that a cross sectional shape of the cam surface

27c1 (27c), with which the peripheral surface of the top engageable roller 23C(23) as viewed in FIG. 6 is in contact, coincides with a circular arc which forms a part of the cam-surface determining circle DS4.

Similar to each of the cam-surface determining circles DS1 and DS2, the diameter of the cam-surface determining circle DS4 is determined by an angle (wedge angle) θ between a tangential line L3 tangent to the cam surface 27c1 (27c) at a point thereon where the engageable roller 23C (23) is in contact with the cam surface 27c1 (27c) and a tangential line L4 tangent to the outer peripheral surface 25a of the rotary output shaft 25 at a point thereon where the engageable roller 23C (23) is in contact with the outer peripheral surface 25a. Even if the diameter of the cam-surface determining circle DS4 is changed by changing the wedge angle θ, the center of the cam-surface determining circle DS4 surely lies on a straight line Y which is orthogonal to the straight line X and which passes through the rotational axis A.

Secondly, a manner of determining the shape of a cam surface 27c2 (27c) with which the peripheral surface of the bottom engageable roller 23D(23) as viewed in FIG. 6 is in contact will be discussed hereinafter.

An axis IS4a of an imaginary circle IS4 having the same cross sectional shape as the engageable roller 23D (23) is positioned on the straight line X at a point thereon where the axis IS4a of the imaginary circle IS4 and the axis 23D1 of the engageable roller 23D (23) are symmetrical with respect to the rotational axis A of the rotational shaft 5. Note that the outline (perimeter) of the top engageable roller 23C (23) as viewed in FIG. 6 is coincident with the imaginary circle IS4. In addition, a cam-surface determining circle DS3 which circumscribes both an outer peripheral surface of the engageable roller 23D (23) and the imaginary circle IS4 (i.e., an outer peripheral surface of the engageable roller 23C (23)) is defined as shown by a two-dot chain line in FIG. 6, and the shape of the cam surface 27c2 (27c) is determined so that a cross sectional shape of the cam surface 27c2 (27c), with which the peripheral surface of the bottom engageable roller 23D(23) as-viewed in FIG. 6 is in contact, coincides with a circular arc which forms a part of the cam-surface determining circle DS3.

The shape of each of the remaining cam surfaces 27c is determined in the same manner. Namely, a straight line which passes through both an axis of the engageable roller 23 that is in contact with the cam surface 27c and the rotational axis A of the rotational shaft 5 is defined as a straight line (not shown), while an axis of an imaginary circle (not shown; the outline (perimeter) of one of the remaining engageable rollers 23 is coincident with this imaginary circle) is positioned on the straight line at a point thereon where the axis of the imaginary circle and the axis of the aforementioned engageable roller 23 that is in contact with the cam surface 27c are symmetrical with respect to the rotational axis A of the rotational shaft 5. In addition, a cam-surface determining circle (not shown) which circumscribes both an outer peripheral surface of the engageable roller 23 and the imaginary circle is defined, and the shape of the cam surface 27c is determined so that a cross sectional shape of the cam surface 27c coincides with a circular arc which forms a part of the cam-surface determining circle.

Immediately after the control circuit in the camera body outputs a forward-rotation drive signal or a reverse-rotation drive signal to the AF motor M to rotate the AF motor M in forward or reverse direction, the rotary input shaft 27 rotates clockwise or counterclockwise as viewed in FIGS. 5 and 6. Thereupon, each differential roller 21 revolves (rotates) around the rotational shaft A in the same rotational direction as the rotary input shaft 27 at a revolving speed half the rotational speed of the rotary input shaft 27 while rotating on the axis C1 of the differential roller 21 to press one of the associated pair of engageable rollers 23 clockwise or counterclockwise which is positioned on the side opposite to the rotational direction of the rotary input shaft 27. This engageable roller 23 which is pressed to rotate clockwise or counterclockwise rotates in the associated accommodation space S2 to firmly wedge into one of the wedge-shaped (radially-narrowed) circumferentially opposite end portions of the associated accommodation space S2 between the associated circumferentially-uneven-depth groove 27a of the rotary input shaft 27 and the outer peripheral surface 25a of the rotary output shaft 25. As a result, the rotation of the rotary input shaft 27 is transferred to the rotary output shaft 25 via each engageable roller 23 to rotate the rotary output shaft 25 in the same rotational direction as the rotary input shaft 27 to perform an autofocusing operation.

Similar to the above described first embodiment of the one-way rotational transfer mechanism, immediately after an in-focus state is obtained by the autofocusing operation, the control circuit sends a control signal to the AF motor M to rotate the AF motor M in a rotational direction opposite to the previous rotational direction of the AF motor M for the autofocusing operation by an angle of rotation smaller than backlash between the pinion P and the input gear of the rotary input shaft 27 in the modification of the first embodiment of the one-way rotational transfer mechanism shown in FIGS. 5 and 6. Thereupon, the rotary input shaft 27 rotates in a rotational direction opposite to the previous rotational direction, in which the rotary input shaft 27 rotates immediately before the aforementioned in-focus state is obtained, without rotating the rotary output shaft 25 to thereby reduce the contacting force of each engageable roller 23 with each of the rotary input shaft 27 and the rotary output shaft 25. This reduction of such a contacting force allows the manual focus ring of the interchangeable lens to be rotated smoothly.

In a state shown in FIG. 5, rotating the manual focus ring of the interchangeable lens causes the rotary output shaft 25 to rotate clockwise or counterclockwise. However, this rotation of the rotary output shaft 25 is not transferred to any of the engageable rollers 23 since the outer peripheral surface 25a of the rotary output shaft 25 has a circular shape as viewed from the front of the one-way rotational transfer mechanism 1', so that rotating the manual focus ring of the interchangeable lens does not cause the rotary input shaft 27 to rotate.

Accordingly, effects similar to those obtained in the first embodiment of the one-way rotational transfer mechanism can be obtained in the modification of the first embodiment of the one-way rotational transfer mechanism shown in FIGS. 5 and 6. Moreover, in an autofocusing operation, a torque of the rotary input shaft 27 is transferred to the rotary output shaft 25 with each engageable roller 23 contacting with the associated cam surface 27c (and also the outer peripheral surface 25a of the rotary output shaft 25). During the transferring of torque from the rotary input shaft 27 to the rotary output shaft 25, each engageable roller 23 causes the rotary input shaft 27 and the rotary output shaft 25 to become integral with each other circumferentially to thereby transfer a torque from the rotary input shaft 27 to the rotary output shaft 25 smoothly and reliably even if each engageable roller 23 comes in contact with the associated cam surface 27c at a point thereon which deviates (due to dimensional errors in the cam surfaces 27c, the engageable rollers 23, and the rotary output shaft 25) from a predetermined point on the associated cam surface 27c when coming into contact with the outer peripheral surface 25a of the rotary output shaft 25 since the shape of each cam surface 27c is determined in the above described manner. Furthermore, even if each engageable roller 23 comes in contact with the associated cam surface 27c at a point thereon which deviates from a predetermined point on the associated cam surface 27c, the contacting force of each engageable roller 23 with each of the associated cam surface 27c and the outer peripheral surface 25a of the rotary output shaft 25 does not become excessively large.

FIGS. 7 through 10 show a second embodiment of the one-way rotational transfer mechanism (torque transfer mechanism) according to the present invention. Elements and portions of this embodiment of the one-way rotational transfer mechanism which are similar to those of the first embodiment of the one-way rotational transfer mechanism are designated by the same reference numerals, and detailed descriptions of such similar elements and portions are omitted from the following descriptions.

The one-way rotational transfer mechanism 30 is provided on the large-diameter portion 5b of the rotational shaft 5 with a hollow-cylindrical rotary input shaft 32 having a small-diameter portion 32a at the front and a large-diameter portion 32b at the rear. The rotary input shaft 32 is provided on a rear surface of the large-diameter portion 32b with an annular recess 32c, and is further provided on an annular front surface of the large-diameter portion 32b with an annular engaging recess 32d (seen as an annular recess as viewed from the front of the rotary input shaft 32).

Figure 9:
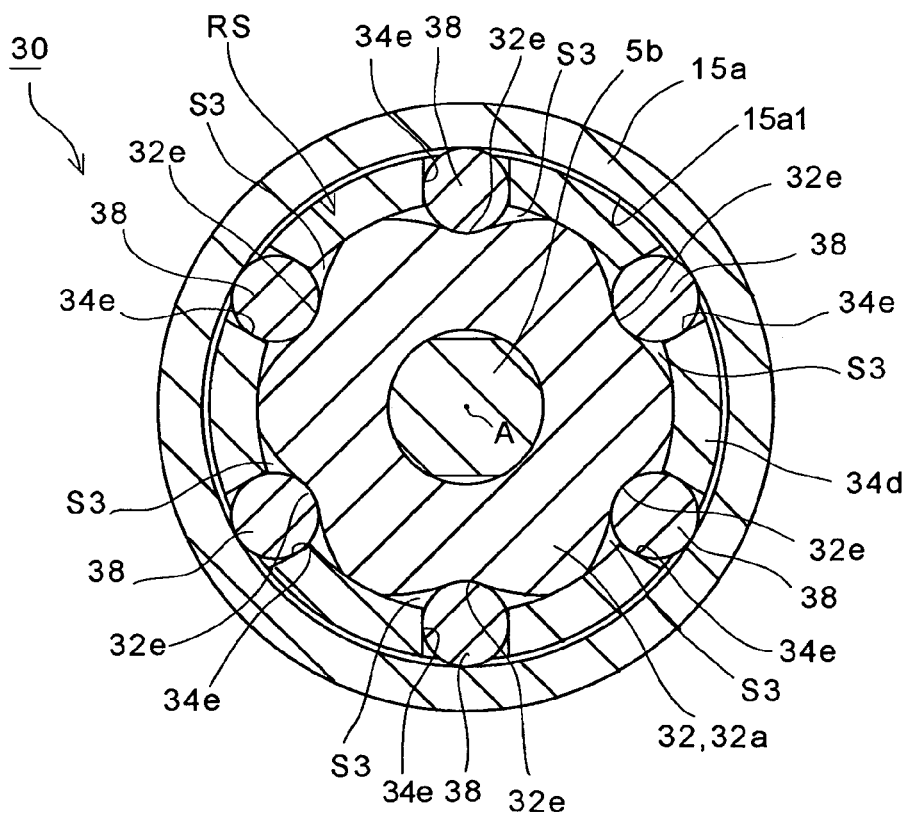
FIG. 9 is a cross sectional view taken along IX—IX line shown in FIG. 7.

The large-diameter portion 32b of the rotary input shaft 32 is circular in cross section, while the small-diameter portion 32a of the rotary input shaft 32 is provided, on an outer peripheral surface thereof at equi-angular intervals in a circumferential direction of the rotary input shaft 32, with six circumferentially-uneven-depth grooves (circumferentially-uneven-width-space forming portions) 32e which have different radial depths at different circumferential positions (see FIG. 9). The six circumferentially-uneven-depth grooves 32e extend parallel to the rotational axis A. The one-way rotational transfer mechanism 30 is provided between each circumferentially-uneven-depth groove 32e and an inner peripheral surface (cylindrical surface) 15a1 of the large-diameter portion 15a of the rotary output shaft 15 with an accommodation space (circumferentially-uneven-width space) S3 having different radial widths at different circumferential positions. In other words, an annular space RS which is formed between the rotary output shaft 15 and the rotary input shaft 32 is divided into six to form the six accommodation spaces S3. The rotary input shaft 32 is provided on an outer peripheral surface of the large-diameter portion 32b with an input gear 32f which is in mesh with the pinion P.

Figure 8:
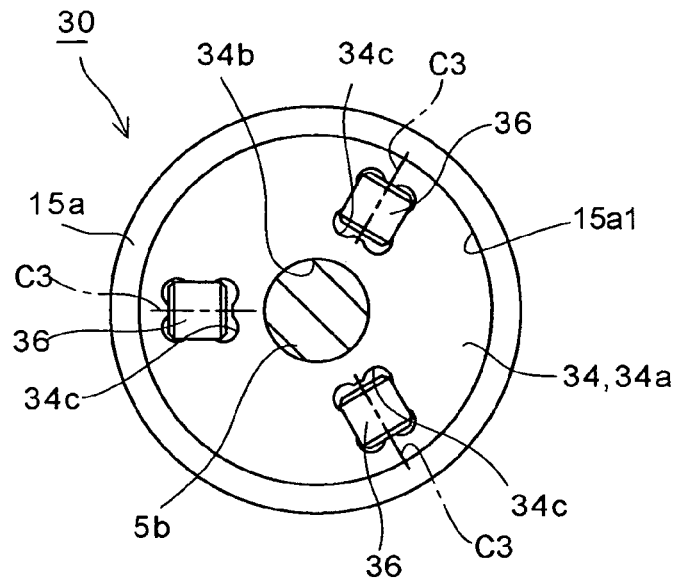
FIG. 8 is a cross sectional view taken along VIII—VIII line shown in FIG. 7.

The one-way rotational transfer mechanism 30 is provided in the rotary output shaft 15 with a retainer 34. The rear end of the retainer 34 is formed as an open end. The retainer 34 is provided at a center of a front wall 34a of the retainer 34 with an insertion hole 34b in which the rotational shaft 5 is inserted. As shown in FIG. 8, the retainer 34 is provided, on the front wall 34a thereof at equi-angular intervals in a circumferential direction, with three fitting holes 34c. A differential roller (differential rotating member) 36 having a substantially columnar shape is installed in each of the three fitting holes 34c so that the differential roller 36 is rotatable about an axis C3 thereof which extends in a radial direction of the rotary output shaft 15. The periphery of each differential roller 36 partly projects forward from a front surface of the front wall 34a of the retainer 34, and partly projects rearward from a rear surface of the front wall 34a of the retainer 34. Each differential roller 36 is held between the pressing surface 17a (which lies on a plane orthogonal to the rotational axis A) of the annular member 17 and an axially-orthogonal surface 32a1 (which lies on a plane orthogonal to the rotational axis A and is parallel to the pressing surface 17a) and is formed on a front surface of the rotary input shaft 32, since a front portion and a rear portion of the peripheral surface of each differential roller 36 are in contact with the pressing surface 17a of the annular member 17 and the annular surface 32a1 of the rotary input shaft 32, respectively.

As shown in FIG. 9, a cylindrical portion 34d of the retainer 34 is positioned in the annular space RS that is formed between the large-diameter portion 15a of the rotary output shaft 15 and the small-diameter portion 32a of the rotary input shaft 32. The cylindrical portion 34d is provided at equi-angular intervals in a circumferential direction with six insertion holes 34e. An engageable roller (torque transfer member) 38 is installed in each insertion hole 34e with an axis C4 of the engageable roller 38 extending parallel to the rotational axis A, and each engageable roller 38 is rotatable on the axis C4 thereof and linearly movable along the axis C4 thereof.

Figure 10:
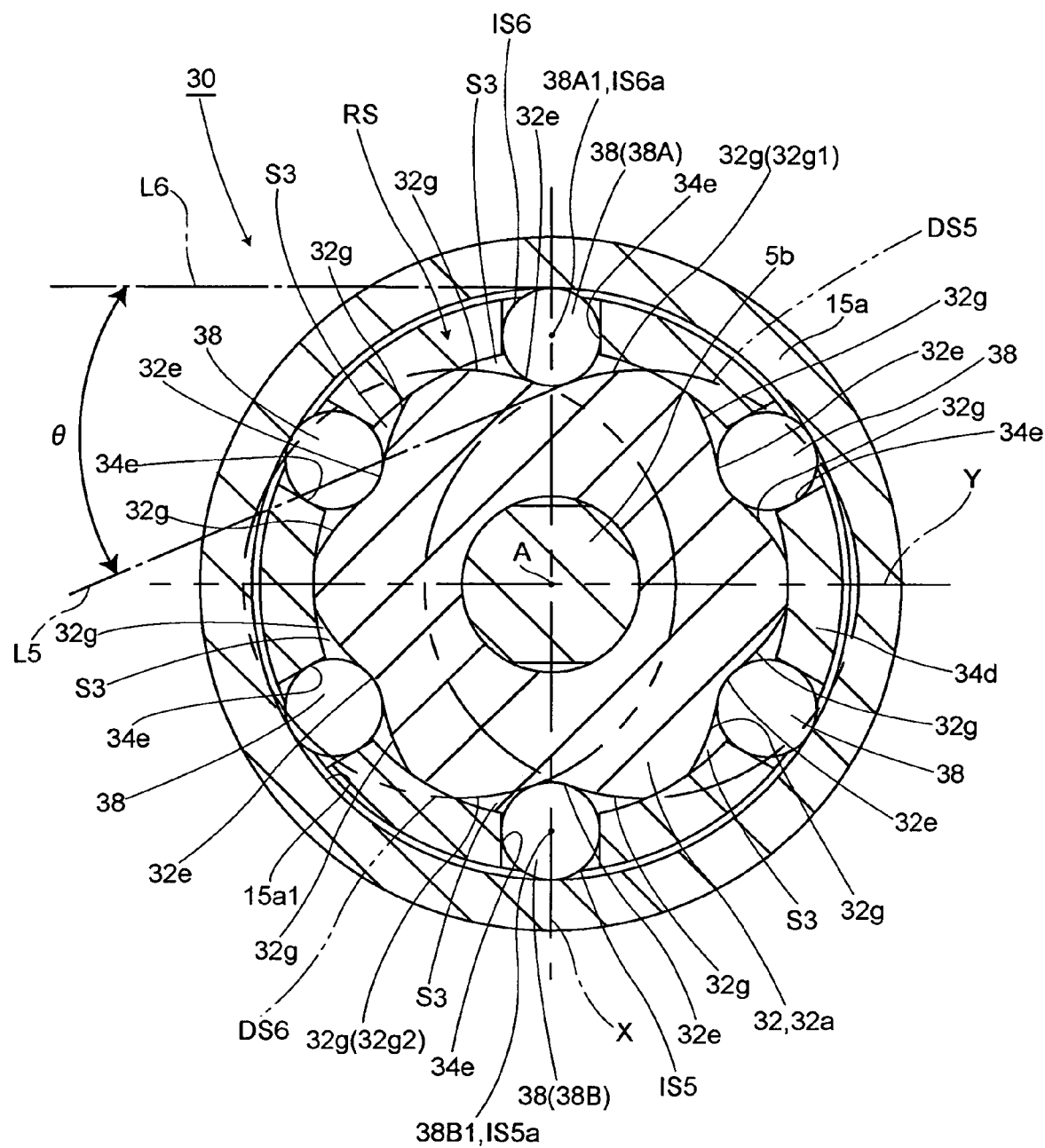
FIG. 10 is an enlarged view of FIG. 9, illustrating the shape of each cam surface formed on an outer peripheral surface of a rotary input shaft.

Each circumferentially-uneven-depth groove 32e is provided with a pair of cam surfaces 32g which are bilaterally symmetrical as viewed in the direction of the rotational axis A as shown in FIG. 10. The shape of each cam surface 32g is determined in a manner which will be discussed hereinafter.

Firstly, a manner of determining the shape of the cam surface 32g1 (32g) with which the peripheral surface of the top engageable roller 38A(38) as viewed in FIG. 10 is in contact will be discussed hereinafter.

In FIG. 10, a straight line which passes through both an axis 38A1 of the engageable roller 38A (38) and the rotational axis A of the rotational shaft 5 is defined as a straight line X, while an axis IS5a of an imaginary circle IS5 having the same cross sectional shape as the engageable roller 38A (38) is positioned on the straight line X at a point thereon where the axis IS5a of the imaginary circle IS5 and the axis 38A1 of the engageable roller 38A (38) are symmetrical with respect to the rotational axis A of the rotational shaft 5. Note that the outline (perimeter) of the bottom engageable roller 38B (38) as viewed in FIG. 10 is coincident with the imaginary circle IS5. In addition, a cam-surface determining circle DS5 which inscribes both an outer peripheral surface of the engageable roller 38A (38) and the imaginary circle IS5 (i.e., an outer peripheral surface of the engageable roller 38B (38)) is defined as shown by a two-dot chain line in FIG. 10, and the shape of the cam surface 32g1 (32g) is determined so that a cross sectional shape of the cam surface 32g1 (32g), with which the peripheral surface of the top engageable roller 38A (38) as viewed in FIG. 10 is in contact, coincides with a circular arc which forms a part of the cam-surface determining circle DS5.

Similar to each of the cam-surface determining circles DS1 through DS4, the diameter of the cam-surface determining circle DS5 is determined by an angle (wedge angle) θ between a tangential line L5 tangent to the cam surface 32g1 (32g) at a point thereon where the engageable roller 38A (38) is in contact with the cam surface 32g1 (32g) and a tangential line L6 tangent to the inner peripheral surface 15a1 of the large-diameter portion 15a at a point thereon where the engageable roller 38A (38) is in contact with the inner peripheral surface 15a1. Even if the diameter of the cam-surface determining circle DS5 is changed by changing the wedge angle θ, the center of the cam-surface determining circle DS5 reliably lies on a straight line Y which is orthogonal to the straight line X and which passes through the rotational axis A.

Secondly, a manner of determining the shape of a cam surface 32g2 (32g) with which the peripheral surface of the bottom engageable roller 38B(38) as viewed in FIG. 10 is in contact will be discussed hereinafter.

An axis IS6a of an imaginary circle IS6 having the same cross sectional shape as the engageable roller 38B (38) is positioned on the straight line X at a point thereon where the axis IS6a of the imaginary circle IS6 and the axis 38B1 of the engageable roller 38B (38) are symmetrical with respect to the rotational axis A of the rotational shaft 5. Note that the outline (perimeter) of the top engageable roller 38A (38) as viewed in FIG. 10 is coincident with the imaginary circle IS6. In addition, a cam-surface determining circle DS6 which inscribes both an outer peripheral surface of the engageable roller 38B (38) and the imaginary circle IS6 (i.e., an outer peripheral surface of the engageable roller 38A (38)) is defined as shown by a two-dot chain line in FIG. 10, and the shape of the cam surface 32g2 (32g) is determined so that a cross sectional shape of the cam surface 32g2 (32g), with which the peripheral surface of the bottom engageable roller 38B (38) as viewed in FIG. 10 is in contact, coincides with a circular arc which forms a part of the cam-surface determining circle DS6.

The shape of each of the remaining cam surfaces 32g is determined in the same manner. Namely, a straight line which passes through both an axis of the engageable roller 38 that is in contact with the cam surface 32g and the rotational axis A of the rotational shaft 5 is defined as a straight line (not shown), while an axis of an imaginary circle (not shown; the outline (perimeter) of one of the remaining engageable rollers 38 is coincident with this imaginary circle) is positioned on the straight line at a point thereon where the axis of the imaginary circle and the axis of the aforementioned engageable roller 38 that is in contact with the cam surface 32g are symmetrical with respect to the rotational axis A of the rotational shaft 5. In addition, a cam-surface determining circle (not shown) which inscribes both an outer peripheral surface of the engageable roller 38 and the imaginary circle is defined, and the shape of the cam surface 32g is determined so that a cross sectional shape of the cam surface 32g coincides with a circular arc which forms a part of the cam-surface determining circle.

Operations of the one-way rotational transfer mechanism 30 having the above described structure will be discussed hereinafter.

Immediately after the control circuit that is provided in the camera body outputs a forward-rotation drive signal to the AF motor M to rotate the AF motor M in forward direction, a forward rotation of the AF motor M is transferred to the rotary input shaft 32 via the engagement of the pinion P with the input gear 32f, so that the rotary input shaft 32 rotates counterclockwise as viewed in FIG. 9 and 10. Thereupon, each differential roller 36 that is held between the pressing surface 17a of the annular member 17 and the axially-orthogonal surface 32a1 of the rotary input shaft 32 revolves (rotates) around the rotational axis A in the same rotational direction (counterclockwise direction) as the rotary input shaft 32 at a rotational speed half the rotational speed of the rotary input shaft 32 while rotating on the axis C3 of the differential roller 36, and accordingly the retainer 34 and each engageable roller 38 also revolve (rotate) around the rotational axis A at the same rotational speed as the differential roller 36. As a result, each differential roller 38 firmly wedges into that one of the wedge-shape (radially-narrowed) circumferentially opposite end portions of the associated accommodation space S3 which is positioned on the clockwise side in the accommodation space S3 between one of the opposite end portions of the associated circumferentially-uneven-depth groove 32e which is positioned on the clockwise side and the inner peripheral surface 15a1 of the large-diameter portion 15a. This causes the small-diameter portion 32a (the rotary input shaft 32) and the rotary output shaft 15 to become integral with each other circumferentially via the six engageable rollers 38, the retainer 34 and the three differential rollers 36, so that the rotation of the small-diameter portion 32a is transferred to the rotary output shaft 15 to rotate the rotary output shaft 15 counterclockwise. Thereupon, this rotation of the rotary output shaft 15 is transferred to the aforementioned focusing mechanism, which is provided in the interchangeable lens, via the output gear 15c to move a focusing lens group (not shown) forward along the photographing optical axis.

On the other hand, if the control circuit in the camera body outputs a reverse-rotation drive signal to the AF motor M to rotate the AF motor M in reverse direction, a reverse rotation of the AF motor M is transferred to the rotary input shaft 32 via the engagement of the pinion P with the input gear 32f, so that the rotary input shaft 32 rotates clockwise as viewed in FIGS. 9 and 10. Thereupon, each differential roller 36 revolves (rotates) around the rotational axis A in the same rotational direction (clockwise direction) as the rotary input shaft 32 at a rotational speed half the rotational speed of the rotary input shaft 32, while each engageable roller 38 and the retainer 34 also revolve (rotate) clockwise around the rotational axis A at a rotational speed the same as the rotational speed of each differential roller 36. As a result, each engageable roller 38 rotates counterclockwise in the associated accommodation space S3 to wedge into the other of the wedge-shape (radially-narrowed) circumferentially opposite end portions of the associated accommodation space S3, which is positioned on the counterclockwise side in the accommodation space S3 between the other of the opposite end portions of the associated circumferentially-uneven-depth groove 32e, positioned on the counterclockwise side and the inner peripheral surface 15a1 of the large-diameter portion 15a. This causes the small-diameter portion 32a (the rotary input shaft 32) and the rotary output shaft 15 to become circumferentially integral with each other via the six engageable rollers 38, the retainer 34 and the three differential rollers 36, thus causing the rotary output shaft 15 to rotate clockwise to thereby move the focusing lens group rearward along the photographing optical axis.

In this manner, the control circuit makes the AF motor M rotate in forward and reverse directions to move the focusing lens forward and rearward to perform an autofocusing operation.

Similar to the first embodiment of the one-way rotational transfer mechanism, immediately after an in-focus state is obtained by the autofocusing operation, the control circuit sends a control signal to the AF motor M to rotate the AF motor M in a rotational direction opposite to the previous rotational direction of the AF motor M for the autofocusing operation by an angle of rotation smaller than backlash between the pinion P and the input gear 32f. Thereupon, the rotary input shaft 32 rotates in a rotational direction opposite to the previous rotational direction, in which the rotary input shaft 32 rotated immediately before the aforementioned in-focus state is obtained, without rotating the rotary output shaft 15 to thereby reduce the contacting force of each engageable roller 38 with each of the rotary input shaft 32 and the rotary output shaft 15. This reduction of such a contacting force allows the manual focus ring of the interchangeable lens to be rotated smoothly.

Secondly, operations of the one-way rotational transfer mechanism 30 when a focusing operation is performed in manual focus mode will be hereinafter discussed.

In a state shown in FIG. 9, if the manual focus ring of the interchangeable lens is manually rotated in a forward or reverse rotational direction with no actuation of the AF motor M, this forward or reverse rotation of the manual focus ring is transferred to the focusing mechanism provided in the interchangeable lens to perform a focusing operation (MF operation).

Upon rotation of the manual focus ring being transferred to the focusing mechanism, rotational force is transferred from the focusing ring to the output gear 15c of the rotary output shaft 15. Subsequently, the rotary output shaft 15 rotates clockwise or counterclockwise about the rotational shaft 5, whereas no rotation is transferred from the rotary output shaft 15 to each engageable roller 38 since the inner peripheral surface (cylindrical surface) 15a1 of the rotary output shaft 15 has a circular shape as viewed from the front of the one-way rotational transfer mechanism 30. Therefore, rotation of the rotary output shaft 15 does not cause either the retainer 34 nor any of the differential rollers 36 to rotate, and does not cause the small-diameter portion 32a (the rotary input shaft 32) to rotate either, thus applying no load on the AF motor M.

As can be understood from the above descriptions, effects similar to those obtained in the first embodiment of the one-way rotational transfer mechanism can be obtained in the second embodiment of the one-way rotational transfer mechanism shown in FIGS. 7 through 10. Moreover, in an autofocusing operation, a torque of the rotary input shaft 32 is transferred to the rotary output shaft 15 with each engageable roller 38 contacting with the associated cam surface 32g. During the transferring of torque from the rotary input shaft 32 to the rotary output shaft 15, each engageable roller 38 causes the rotary input shaft 32 and the rotary output shaft 15 to become integral with each other circumferentially to thereby transfer a torque from the rotary input shaft 32 to the rotary output shaft 15 smoothly and reliably even if each engageable roller 38 comes in contact with the associated cam surface 32g at a point thereon which deviates (due to dimensional errors in the cam surfaces 32g, the engageable rollers 38, and the rotary output shaft 15) from a predetermined point on the associated cam surface 32g when coming into contact with the inner peripheral surface 15a1 of the large-diameter portion 15a since the shape of each cam surface 32g is determined in the above described manner. Furthermore, even if each engageable roller 38 comes in contact with the associated cam surface 32g at a point thereon which deviates from a predetermined point on the associated cam surface 32g, the contacting force of each engageable roller 38 with each of the associated cam surface 32g and the inner peripheral surface 15a1 of the large-diameter portion 15a does not become excessively large.

Moreover, due to the utilization of the retainer 34, the annular space RS, which is formed between the small-diameter portion 32a of the rotary input shaft 32 and the rotary output shaft 15, can be used in a space-effective manner. This makes it possible to increase the number of the engageable rollers 38. Increasing the number of the engageable rollers 38 makes it possible to improve the efficiency of transferring torque from the rotary input shaft 32 to the rotary output shaft 15.

Figure 11:
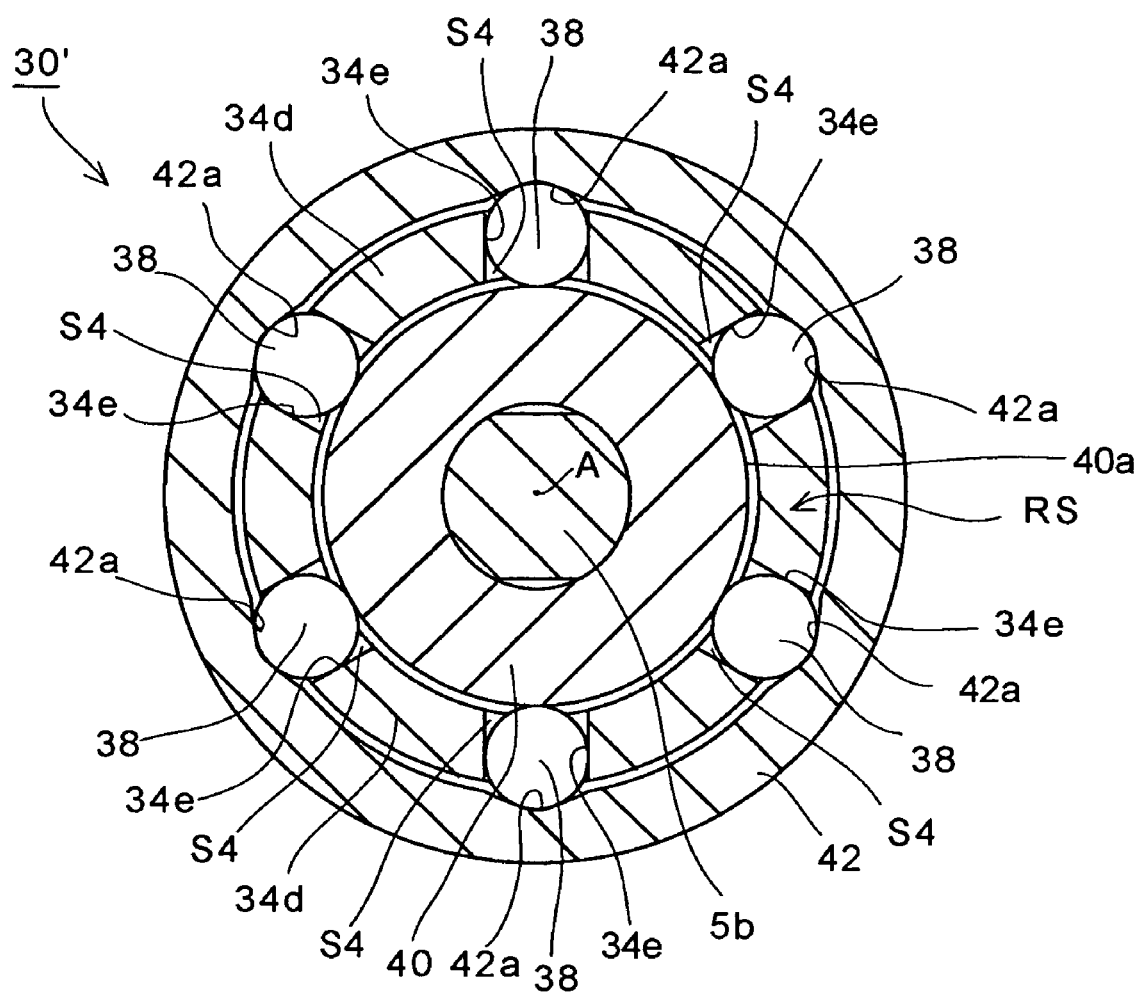
FIG. 11 is a view similar to that of FIG. 9, showing a modification of the second embodiment of the one-way rotational transfer mechanism.
Figure 12:
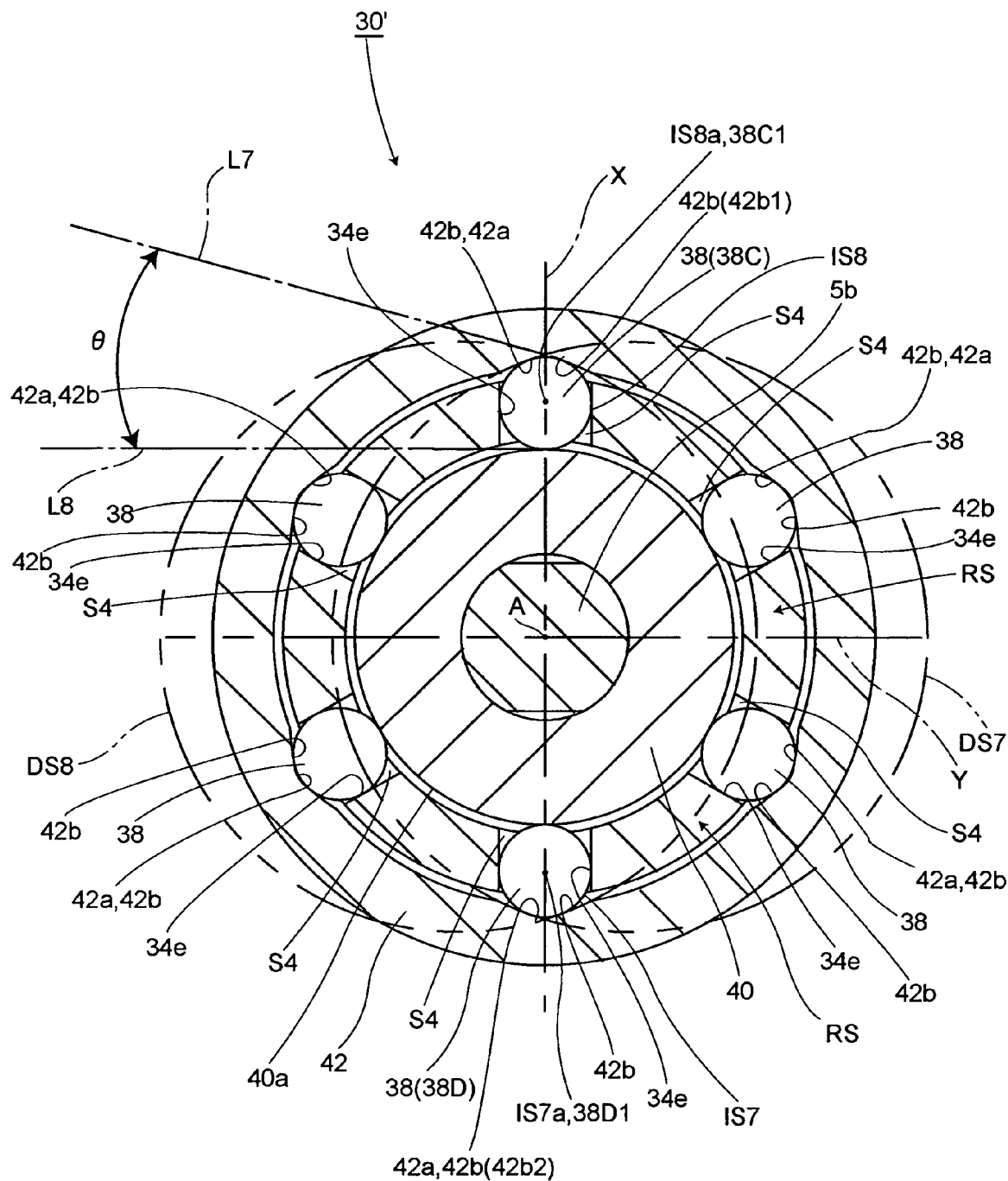
FIG. 12 is a developed view of FIG. 11, illustrating the shape of each cam surface formed on an inner peripheral surface of a rotary input shaft.

FIGS. 11 and 12 shows a modification of the second embodiment of the one-way rotational transfer mechanism, in which a rotary input shaft and a rotary output shaft are positioned in a radially reversed fashion; namely, a rotary input shaft 42 is positioned radially outside a hollow-cylindrical rotary output shaft 40.

In the one-way rotational transfer mechanism (torque transfer mechanism) 30' shown in FIGS. 11 and 12, the rotary output shaft 40 is rotatably fitted on the large-diameter portion 5b of the rotational shaft 5, while the hollow-cylindrical rotary input shaft 42 is positioned radially outside the rotary output shaft 40 to be rotatable about the axis of the rotational shaft 5. The rotary input shaft 42 is provided, on an inner peripheral surface thereof at equiangular intervals in a circumferential direction of the rotary input shaft 42, with six circumferentially-uneven-depth grooves (circumferentially-uneven-width-space forming portions) 42a which have different radial depths at different circumferential positions. The one-way rotational transfer mechanism 30' is provided between each circumferentially-uneven-depth groove 42a and an outer peripheral surface (torque transfer cylindrical surface) 40a (which is centered about the rotational axis A) of the rotary output shaft 40 with an accommodation space (circumferentially-uneven-width space) S4 having different radial widths at different circumferential positions.

The annular member 17 (not shown in either FIG. 11 or FIG. 12), which is continuously biased rearward by the spring force of the compression coil spring 19, is positioned in front of the annular space RS (the accommodation spaces S4) that is formed between the rotary input shaft 42 and the rotary output shaft 40. The cylindrical portion 34d of the retainer 34 is positioned in the annular space RS (the accommodation spaces S4). Although not shown in FIGS. 11 and 12, the three differential rollers 36 are respectively installed in the three fitting holes 34c that are formed on the front wall 34a of the retainer 34 so that each differential roller 36 can freely rotate on the axis C3 thereof. Each differential roller 36 is held at all times between a rear surface of a front annular flange (not shown), which projects radially outwards from an outer peripheral surface of the rotational shaft 5 to be orthogonal to the axis of the rotational shaft 5, and a front surface (axially-orthogonal surface which is orthogonal to the rotational axis A) of a rear annular flange (not shown) which is positioned behind the aforementioned front annular flange and which projects radially inwards from an inner peripheral surface of the rotary input shaft 42 to be orthogonal to the axis of the rotational shaft 5. Additionally, the retainer 34 is provided on the cylindrical portion 34d thereof in a circumferential direction with six insertion holes 34e, an engageable roller 38 is installed in each insertion hole 34e to be rotatable about the axis C4 and movable along the axis C4 (the axis C4 extending parallel to the rotational axis A), and the six engageable rollers 38 are positioned in the accommodation spaces S4, respectively.

The rotary input shaft 42 is provided with an input gear (not shown) which is in mesh with the pinion P of the AF motor M, while the rotary output shaft 40 is provided with an output gear (not shown) which is in mesh with the aforementioned input gear of the focusing mechanism provided in the interchangeable lens.

As shown in FIG. 12, each circumferentially-uneven-depth groove 42a is provided with a pair of cam surfaces 42b which are bilaterally symmetrical as viewed in the direction of the rotational axis A. The shape of each cam surface 42*b* is determined in a manner which will be discussed hereinafter.

Firstly, a manner of determining the shape of the cam surface 42*b*1 (42*b*) with which the peripheral surface of the top engageable roller 38C (38) as viewed in FIG. 12 is in contact will be discussed hereinafter.

In FIG. 12, a straight line which passes through both an axis 38C1 of the engageable roller 38C (38) and the rotational axis A of the rotational shaft 5 is defined as a straight line X, while an axis IS7*a* of an imaginary circle IS7 having the same cross sectional shape as the engageable roller 38C (38) is positioned on the straight line X at a point thereon where the axis IS7*a* of the imaginary circle IS7 and the axis 38C1 of the engageable roller 38C (38) are symmetrical with respect to the rotational axis A of the rotational shaft 5. Note that the outline (perimeter) of the bottom engageable roller 38D (38) as viewed in FIG. 12 is coincident with the imaginary circle IS7. In addition, a cam-surface determining circle DS8 which circumscribes both an outer peripheral surface of the engageable roller 38C (38) and the imaginary circle IS7 (i.e., an outer peripheral surface of the engageable roller 38D (38)) is defined as shown by a two-dot chain line in FIG. 12, and the shape of the cam surface 42*b*1 (42*b*) is determined so that a cross sectional shape of the cam surface 42*b*1 (42*b*), with which the peripheral surface of the top engageable roller 38C (38) as viewed in FIG. 12 is in contact, coincides with a circular arc which forms a part of the cam-surface determining circle DS8.

Similar to each of the cam-surface determining circles DS1 through DS6, the diameter of the cam-surface determining circle DS8 is determined by an angle (wedge angle) θ between a tangential line L7 tangent to the cam surface 42*b*1 (42*b*) at a point thereon where the engageable roller 38C (38) is in contact with the cam surface 42*b*1 (42*b*) and a tangential line L8 tangent to the outer peripheral surface 40*a* of the rotary output shaft 40 at a point thereon where the engageable roller 38C (38) is in contact with the outer peripheral surface 40*a*. Even if the diameter of the cam-surface determining circle DS8 is changed by changing the wedge angle θ, the center of the cam-surface determining circle DS8 reliably lies on a straight line Y which is orthogonal to the straight line X and which passes through the rotational axis A.

Secondly, a manner of determining the shape of a cam surface 42*b*2 (42*b*) with which the peripheral surface of the bottom engageable roller 38D(38) as viewed in FIG. 12 is in contact will be discussed hereinafter.

An axis IS8*a* of an imaginary circle IS8 having the same cross sectional shape as the engageable roller 38D (38) is positioned on the straight line X at a point thereon where the axis IS8*a* of the imaginary circle IS8 and the axis 38D1 of the engageable roller 38D (38) are symmetrical with respect to the rotational axis A of the rotational shaft 5. Note that the outline (perimeter) of the top engageable roller 38C (38) as viewed in FIG. 12 is coincident with the imaginary circle IS8. In addition, a cam-surface determining circle DS7 which circumscribes both an outer peripheral surface of the engageable roller 38D (38) and the imaginary circle IS8 (i.e., an outer peripheral surface of the engageable roller 38C (38)) is defined as shown by a two-dot chain line in FIG. 12, and the shape of the cam surface 42*b*2 (42*b*) is determined so that a cross sectional shape of the cam surface 42*b*2 (42*b*), with which the peripheral surface of the bottom engageable roller 38D (38) as viewed in FIG. 12 is in contact, coincides with a circular arc which forms a part of the cam-surface determining circle DS7.

The shape of each of the remaining cam surfaces 42*b* is determined in the same manner. Namely, a straight line which passes through both an axis of the engageable roller 38 that is in contact with the cam surface 42*b* and the rotational axis A of the rotational shaft 5 is defined as a straight line (not shown), while an axis of an imaginary circle (not shown; the outline (perimeter) of one of the remaining engageable rollers 38 is coincident with this imaginary circle) is positioned on the straight line at a point thereon where the axis of the imaginary circle and the axis of the aforementioned engageable roller 38 that is in contact with the cam surface 42*b* are symmetrical with respect to the rotational axis A of the rotational shaft 5. In addition, a cam-surface determining circle (not shown) which circumscribes both an outer peripheral surface of the engageable roller 38 and the imaginary circle is defined, and the shape of the cam surface 42*b* is determined so that a cross sectional shape of the cam surface 42*b* coincides with a circular arc which forms a part of the cam-surface determining circle.

Immediately after the control circuit in the camera body outputs a forward-rotation drive signal or a reverse-rotation drive signal to the AF motor M to rotate the AF motor M in forward or reverse direction, the rotary input shaft 42 rotates clockwise or counterclockwise as viewed in FIGS. 11 and 12, while each differential roller 36, the retainer 34 and each engageable roller 38 revolve (rotate) in the same rotational direction as the rotary input shaft 42 at a rotational speed half the rotational speed of the rotary input shaft 42. Thereupon, each engageable roller 38 rotates in the associated accommodation space S4 in a rotational direction opposite to the rotational direction of the rotary input shaft 42 to firmly wedge into one of the wedge-shape (radially-narrowed) circumferentially opposite ends of the associated accommodation space S4 between the associated circumferentially-uneven-depth groove 42*a* of the rotary input shaft 42 and the outer peripheral surface 40*a* of the rotary output shaft 40. As a result, the rotation of the rotary input shaft 42 is transferred to the rotary output shaft 40 via each engageable roller 38 to rotate the rotary output shaft 40 in the same rotational direction as the rotary input shaft 42 to perform an autofocusing operation.

Similar to the above described second embodiment of the one-way rotational transfer mechanism, in the modification of the second embodiment of the one-way rotational transfer mechanism shown in FIGS. 11 and 12, immediately after an in-focus state is obtained by the autofocusing operation, the control circuit sends a control signal to the AF motor M to rotate the AF motor M in a rotational direction opposite to the previous rotational direction of the AF motor M for the autofocusing operation by an angle of rotation smaller than backlash between the pinion P and the input gear of the rotary input shaft 42. Thereupon, the rotary input shaft 42 rotates in a rotational direction opposite to the previous rotational direction, in which the rotary input shaft 42 rotated immediately before the aforementioned in-focus state is obtained, without rotating the rotary output shaft 40 to thereby reduce the contacting force of each engageable roller 38 with each of the rotary input shaft 42 and the rotary output shaft 40. This reduction of such a contacting force allows the manual focus ring of the interchangeable lens to be rotated smoothly.

In a state shown in FIG. 11, rotating the manual focus ring of the interchangeable lens causes the rotary output shaft 40 to rotate clockwise or counterclockwise. However, this rotation of the rotary output shaft 40 is not transferred to any of the engageable rollers 38 since the outer peripheral surface 40*a* of the rotary-output shaft 40 has a circular shape as viewed from the front of the one-way rotational transfer mechanism 30', so that rotating the manual focus ring of the interchangeable lens does not cause the rotary input shaft 42 to rotate.

Accordingly, effects similar to those obtained in the second embodiment of the one-way rotational transfer mechanism can be obtained in the modification of the second embodiment of the one-way rotational transfer mechanism shown in FIG. 11.

Moreover, in an autofocusing operation, a torque of the rotary input shaft 42 is transferred to the rotary output shaft 40 with each engageable roller 38 contacting with the associated cam surface 42b. During the transferring of torque from the rotary input shaft 42 to the rotary output shaft 40, each engageable roller 38 causes the rotary input shaft 42 and the rotary output shaft 40 to become integral with each other circumferentially to thereby transfer a torque from the rotary input shaft 42 to the rotary output shaft 40 smoothly and surely even if each engageable roller 38 comes in contact with the associated cam surface 42b at a point thereon which deviates (due to dimensional errors in the cam surfaces 42b, the engageable rollers 38, and the rotary output shaft 40) from a predetermined point on the associated cam surface 42b when coming into contact with the outer peripheral surface 40a of the rotary output shaft 40 since the shape of each cam surface 42b is determined in the above described manner. Furthermore, even if each engageable roller 38 comes in contact with the associated cam surface 42b at a point thereon which deviates from a predetermined point on the associated cam surface 42b, the contacting force of each engageable roller 38 with each of the associated cam surface 42b and the outer peripheral surface 40a of the rotary output shaft 40 does not become excessively large.

In each of the above described embodiments of the one-way rotational transfer mechanisms, each differential roller 21 or 36 can be replaced by a simple spherical member and also each engageable roller 23 or 38 can also be replaced by a simple spherical member if the efficiency of transferring torque from the rotary input shaft 7, 27, 32 or 42 to the rotary output shaft 15, 25 or 40, respectively, does not have to be taken into account.

Figure 13:
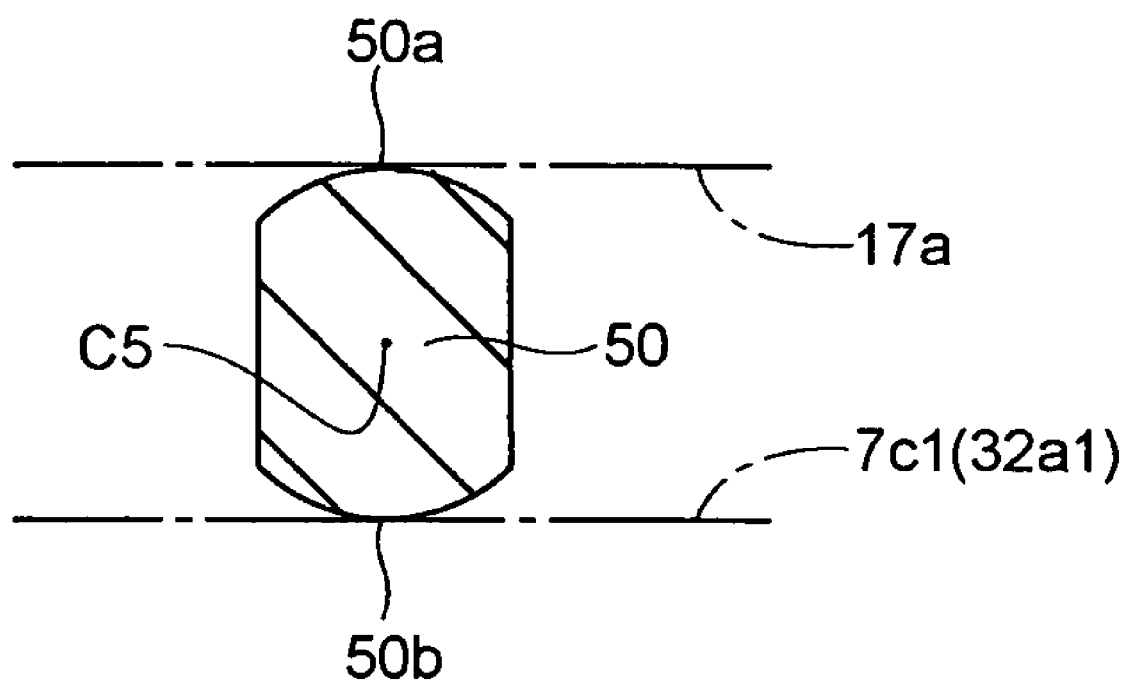
FIG. 13 is a cross sectional view of a modification of a differential roller, taken along a plane orthogonal to the axis of the differential roller.

Each differential roller 21 or 36 can be replaced by a differential roller 50 such as shown in FIG. 13. The differential roller 50 is formed so that an axis C5 thereof extends in a radial direction of the rotary input shaft (7 or 32) or the rotary input shaft (27 or 42), and so that the cross sectional shape of the differential roller 50 is the same as that shown in FIG. 13 at any axial position on the axis C5. In this case, the rotary input shaft (7 or 32) or the rotary input shaft (27 or 42) is rotated via each differential roller 50 in a range so that a pair of arc portions 50a and 50b of the differential roller 50 remain engaged with the pressing surface 17a of the annular member 17 and the axially-orthogonal surface (7c1, 27b or 32a) of the rotary input shaft (7, 27 or 32), respectively, to make each engageable roller 23 or 38 wedge firmly between the rotary input shaft (7 or 32) and the rotary output shaft 15 or between the rotary input shaft (27 or 42) and the rotary output shaft (25 or 40).

In addition, each differential roller 21, 36 or 50 and each engageable roller 23 or 38 can be installed only in a single accommodation space S1, S2, S3 or S4 if the efficiency of transferring torque from the rotary input shaft 7, 27, 32 or 42 to the rotary output shaft 15, 25 or 40 does not have to be taken into account.

In each of the modification of the first embodiment of the one-way rotational transfer mechanism, the second embodiment of the one-way rotational transfer mechanism and the modification of the second embodiment of the one-way rotational transfer mechanism, the number of the circumferentially-uneven-depth grooves (27a, 32e or 42a) that are formed on the rotary input shaft 32 can be changed while the number of the engageable rollers (23 or 38) can be changed to correspond to the number of the circumferentially-uneven-depth grooves (27a, 32e or 42a). In this case, the shape of each cam surface (7g, 27c or 42b) can also be determined in the above described manner.

The efficiency of transferring torque transferred from the rotary input shaft (7, 27, 32 or 42) to the rotary output shaft (15, 25 or 40) can be changed by the following factors: the wedge angle between the tangential line L1 and L2 (see FIG. 3), between the tangential line L3 and L4 (see FIG. 6), between the tangential line L5 and L6 (see FIG. 10), or between the tangential line L7 and L8 (see FIG. 12); or by the following factors: the spring force of the compression coil spring 19, the surface friction of the axially-orthogonal surface 7c1, 27b or 32a1, and the surface friction of the pressing surface 17a of the annular member 17.

In addition, although the one-way rotational transfer mechanisms 1, 1', 30 and 30' are installed between the AF motor M and a focusing mechanism of an interchangeable lens in the above described embodiments of the one-way rotational transfer mechanisms, each of the one-way rotational transfer mechanisms 1, 1', 30 and 30' can be installed between a zoom motor provided in a camera body and a zooming mechanism which is provided in an interchangeable lens to be associated with a zoom ring of the interchangeable lens so that rotation of the zoom motor is transferred to the zooming mechanism and so that rotation of the zoom ring is not transferred to the zoom motor. This makes a power zoom operation (motor-driven zooming operation) and a manual zoom operation possible without the need for any switch for switching between power zoom mode and manual zoom mode. Moreover, the power zoom operation is performed smoothly even if the user touches the zoom ring during the power zoom operation since the zoom ring does not rotate at the power zoom operation.

The present invention can be applied to a one-way clutch (not shown) that serves as a torque transfer mechanism. For instance, a one-way clutch is provided with a rotary input shaft which is freely rotatable about a rotational axis (A), and a hollow-cylindrical rotary output shaft which is positioned around the rotary input shaft to be freely rotatable about the rotational axis (A) relative to the rotary input shaft, wherein at least one circumferentially-uneven-width-space forming portion (e.g., circumferentially-uneven-depth grooves) including cam surfaces is formed on the rotary input shaft, and wherein at least one circumferentially-uneven-width space is formed between the rotary input shaft and a cylindrical inner peripheral surface of the hollow-cylindrical rotary output shaft while at least one engageable roller (23) is installed in each circumferentially-uneven-width space to be freely movable therein. In the one-way clutch having such a structure, a rotation of the rotary input shaft is transferred to the hollow-cylindrical rotary output shaft if the rotary input shaft is rotated forward, but is not transferred to the hollow-cylindrical rotary output shaft if the rotary input shaft is rotated reversely. If the present invention is applied to the aforementioned cam surfaces of this type of one-way clutch, the one-way clutch operates smoothly and reliably even if dimensional errors occur in such members as the cam surfaces or the engageable rollers (23) in the production thereof.

Alternatively, a one-way clutch can be constructed so that the one-way clutch includes a rotary output shaft which is freely rotatable about a rotational axis (A) and that a hollow-cylindrical rotary input shaft which is positioned around the rotary output shaft to be freely rotatable about the rotational axis (A) relative to the rotary output shaft, wherein at least one circumferentially-uneven-width-space forming portion (e.g., circumferentially-uneven-depth grooves) including cam surfaces is formed on an inner peripheral surface of the hollow-cylindrical rotary input shaft, wherein at least one circumferentially-uneven-width space is formed between the hollow-cylindrical rotary input shaft and the rotary output shaft while at least one engageable roller (23) is installed in each circumferentially-uneven-width space to be freely movable therein, and wherein the present invention is applied to the aforementioned cam surfaces of the hollow-cylindrical rotary input shaft.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A rotational transfer mechanism including:
a hollow-cylindrical rotary output shaft having an inner peripheral surface serving as a torque transfer cylindrical surface;
a rotary input shaft positioned radially inside said hollow-cylindrical rotary output shaft to be rotatable relative to said hollow-cylindrical rotary output shaft;
a circumferentially-uneven-width-space forming portion which includes at least one cam surface, and is formed on said rotary input shaft to form at least one accommodation space between said rotary input shaft and said torque transfer cylindrical surface, said accommodation space having different radial widths at different circumferential positions; and
at least one torque transfer member installed in said accommodation space, said torque transfer member being movable in said accommodation space in a circumferential direction to wedge between said cam surface and said torque transfer cylindrical surface to cause said rotary input shaft and said hollow-cylindrical rotary output shaft to become integral with each other in said circumferential direction when said rotary input shaft rotates relative to said hollow-cylindrical rotary output shaft, wherein said torque transfer member is circular in cross section along a plane orthogonal to a rotational axis of said rotary input shaft and said hollow-cylindrical rotary output shaft,
wherein the shape of a cross section of said cam surface along a plane orthogonal to said rotational axis is defined by a straight line which passes through said rotational axis and an axis of said torque transfer member which is in contact with said cam surface; an imaginary circle having the same cross sectional shape as said torque transfer member on said straight line at a point thereon where an axis of said imaginary circle and said axis of said torque transfer member are symmetrical with respect to said rotational axis; a cam-surface defining circle which inscribes both said imaginary circle and said torque transfer member; and a circular arc which forms a part of said cam-surface defining circle as said cam surface.

2. The rotational transfer mechanism according to claim 1, wherein said rotational transfer mechanism serves as a one-way rotational transfer mechanism,
wherein said rotary input shaft comprises an orthogonal surface lying on a plane orthogonal to said rotational axis,
wherein said rotational transfer mechanism comprises a differential rotating member installed in said accommodation space, and pressed against said orthogonal surface by a biasing device, said differential rotating member revolving around said rotational axis in a same direction as a rotational direction of said rotary input shaft while revolving at a slower speed than a rotation of said rotary input shaft in association with said rotation of said rotary input shaft to press said torque transfer member so that said torque transfer member rotates in a direction opposite to said rotational direction of said rotary input shaft, and
wherein said circumferentially-uneven-width-space forming portion is shaped so that said torque transfer member which rotates in said circumferential direction wedges between said cam surface and said torque transfer cylindrical surface to transfer a torque of said rotary input shaft to said hollow-cylindrical rotary output shaft when said rotary input shaft is rotated.

3. The rotational transfer mechanism according to claim 2, wherein said torque transfer member comprises a pair of torque transfer members which are positioned on opposite sides of an associated said differential rotating member along said circumferential direction in a manner so as to hold said associated said differential rotating member.

4. The one-way rotational transfer mechanism according to claim 2, wherein said biasing device comprises a compression coil spring.

5. The rotational transfer mechanism according to claim 2, wherein said differential member comprises a columnar member having an axis extending in a radial direction of said rotary input shaft.

6. The rotational transfer mechanism according to claim 1, wherein said rotational transfer mechanism serves as a one-way rotational transfer mechanism,
wherein said rotary input shaft comprises an orthogonal surface lying on a plane orthogonal to said rotational axis,
wherein said circumferentially-uneven-width-space forming portion forms an annular space including said accommodation space between said rotary input shaft and said torque transfer cylindrical surface,
wherein said rotational transfer mechanism comprises:
a differential rotating member pressed against said orthogonal surface by a biasing device, said differential rotating member revolving around said rotational axis in a same direction as a rotational direction of said rotary input shaft while revolving at a slower speed than a rotation of said rotary input shaft in association with said rotation of said rotary input shaft to press said torque transfer member so that said torque transfer member rotates in a direction opposite to said rotational direction of said rotary input shaft; and
a retainer installed in said annular space to retain said torque transfer member, and rotating around said rotational axis in a direction opposite to the rotational direction of the rotary input shaft when pressed by said differential rotating member, and
wherein said circumferentially-uneven-width-space forming portion is shaped so that said torque transfer member, which rotates in said circumferential direction, wedges between said cam surface and said torque transfer cylindrical surface to transfer a torque of said rotary input shaft to said hollow-cylindrical rotary output shaft when said rotary input shaft is rotated.

7. The one-way rotational transfer mechanism according to claim 4, wherein said biasing device comprises a compression coil spring.

8. The rotational transfer mechanism according to claim 6, wherein said differential member comprises a columnar member having an axis extending in a radial direction of said rotary input shaft.

9. The rotational transfer mechanism according to claim 1, wherein said rotational transfer mechanism serves as a one-way clutch,
wherein said circumferentially-uneven-width-space forming portion causes said torque transfer member to wedge between said cam surface and said torque transfer cylindrical surface to transfer a torque of said rotary input shaft to said hollow-cylindrical rotary output shaft when said rotary input shaft is rotated forward, and
wherein said circumferentially-uneven-width-space forming portion prevents said torque transfer member from wedging between said cam surface and said torque transfer cylindrical surface to prevent said torque of said rotary input shaft from being transferred to said hollow-cylindrical rotary output shaft when said rotary input shaft is rotated reversely.

10. The rotational transfer mechanism according to claim 1, wherein said accommodation space comprises a plurality of accommodation spaces formed between said circumferentially-uneven-width-space forming portion and said torque transfer cylindrical surface of said hollow-cylindrical rotary output shaft,
wherein said at least one torque transfer member is installed in each of said plurality of accommodation spaces.

11. The rotational transfer mechanism according to claim 1, wherein said circumferentially-uneven-width-space forming portion comprises circumferentially-uneven-depth grooves each extending in a longitudinal direction of said rotary input shaft and having different radial depths at different circumferential positions.

12. The rotational transfer mechanism according to claim 1, wherein said torque transfer member comprises a columnar member having an axis parallel to said rotational axis.

13. The rotational transfer mechanism according to claim 1, wherein a diameter of said cam-surface determining circle is determined by an angle between a first tangential line tangent to said cam surface at a point thereon where said torque transfer member is in contact with said cam surface and a second tangential line tangent to said torque transfer cylindrical surface at a point thereon where said torque transfer member is in contact with said torque transfer cylindrical surface.

14. A rotational transfer mechanism including:
a rotary output shaft having an outer peripheral surface serving as a torque transfer cylindrical surface;
a hollow-cylindrical rotary input shaft positioned around said rotary output shaft to be rotatable relative to said rotary output shaft;
a circumferentially-uneven-width-space forming portion which includes at least one cam surface, and is formed on said hollow-cylindrical rotary input shaft to form at least one accommodation space between said hollow-cylindrical rotary input shaft and said rotary output shaft, said accommodation space having different radial widths at different circumferential positions; and
at least one torque transfer member installed in said accommodation space, and said torque transfer member being movable in said accommodation space in a circumferential direction to wedge between said cam surface and said torque transfer cylindrical surface to cause said hollow-cylindrical rotary input shaft and said rotary output shaft to become integral with each other in said circumferential direction when said hollow-cylindrical rotary input shaft rotates relative to said rotary output shaft, wherein said torque transfer member is circular in cross section along a plane orthogonal to a rotational axis of said hollow-cylindrical rotary input shaft and said rotary output shaft,
wherein the shape of a cross section of said cam surface along a plane orthogonal to said rotational axis is defined by a straight line which passes through said rotational axis and an axis of said torque transfer member which is in contact with said cam surface; an imaginary circle having the same cross sectional shape as said torque transfer member on said straight line at a point thereon where an axis of said imaginary circle and said axis of said torque transfer member are symmetrical with respect to said rotational axis; a cam-surface defining circle which circumscribes both said imaginary circle and said torque transfer member which is in contact with said cam surface; and a circular arc which forms a part of said cam-surface defining circle as said cam surface.

15. The rotational transfer mechanism according to claim 14, wherein said rotational transfer mechanism serves as a one-way rotational transfer mechanism
wherein said hollow-cylindrical rotary input shaft comprises an orthogonal surface lying on a plane orthogonal to said rotational axis,
wherein said rotational transfer mechanism comprises a differential rotating member installed in said accommodation space, and pressed against said orthogonal surface by a biasing device, said differential rotating member revolving around said rotational axis in a same direction as a rotational direction of said hollow-cylindrical rotary input shaft while revolving at a slower speed than a rotation of said hollow-cylindrical rotary input shaft in association with said rotation of said hollow-cylindrical rotary input shaft to press said torque transfer member so that said torque transfer member rotates in a direction opposite to said rotational direction of said hollow-cylindrical rotary input shaft, and
wherein said circumferentially-uneven-width-space forming portion is shaped so that said torque transfer member which rotates in said circumferential direction wedges between said cam surface and said torque transfer cylindrical surface to transfer a torque of said hollow-cylindrical rotary input shaft to said rotary output shaft when said hollow-cylindrical rotary input shaft is rotated.

16. The rotational transfer mechanism according to claim 15, wherein said torque transfer member comprises a pair of torque transfer members which are positioned on opposite sides of an associated said differential rotating member along said circumferential direction in a manner so as to hold said associated said differential rotating member.

17. The one-way rotational transfer mechanism according to claim 15, wherein said biasing device comprises a compression coil spring.

18. The rotational transfer mechanism according to claim 15, wherein said differential member comprises a columnar member having an axis extending in a radial direction of said hollow-cylindrical rotary input shaft.

19. The rotational transfer mechanism according to claim 14, wherein said rotational transfer mechanism serves as a one-way rotational transfer mechanism,
- wherein said hollow-cylindrical rotary input shaft comprises an orthogonal surface lying on a plane orthogonal to said rotational axis,
- wherein said circumferentially-uneven-width-space forming portion forms an annular space including said accommodation space between said hollow-cylindrical rotary input shaft and said torque transfer cylindrical surface,
- wherein said rotational transfer mechanism comprises:
  - a differential rotating member pressed against said orthogonal surface by a biasing device, said differential rotating member revolving around said rotational axis in a same direction as a rotational direction of said hollow-cylindrical rotary input shaft while revolving at a slower speed than a rotation of said hollow-cylindrical rotary input shaft in association with said rotation of said hollow-cylindrical rotary input shaft to press said torque transfer member so that said torque transfer member rotates in a direction opposite to a rotational direction of said hollow-cylindrical rotary input shaft; and
  - a retainer installed in said annular space to retain said torque transfer member, and rotating around said rotational axis in a direction opposite to the rotational direction of the hollow-cylindrical rotary input shaft when pressed by said differential rotating member, and
- wherein said circumferentially-uneven-width-space forming portion is shaped so that said torque transfer member which rotates in said circumferential direction wedges between said cam surface and said torque transfer cylindrical surface to transfer a torque of said hollow-cylindrical rotary input shaft to said rotary output shaft when said hollow-cylindrical rotary input shaft is rotated.

20. The one-way rotational transfer mechanism according to claim 19, wherein said biasing device comprises a compression coil spring.

21. The rotational transfer mechanism according to claim 19, wherein said differential member comprises a columnar member having an axis extending in a radial direction of said hollow-cylindrical rotary input shaft.

22. The rotational transfer mechanism according to claim 14, wherein said rotational transfer mechanism serves as a one-way clutch,
- wherein said circumferentially-uneven-width-space forming portion causes said torque transfer member to wedge between said cam surface and said torque transfer cylindrical surface to transfer a torque of said hollow-cylindrical rotary input shaft to said rotary output shaft when said hollow-cylindrical rotary input shaft is rotated forward, and
- wherein said circumferentially-uneven-width-space forming portion prevents said torque transfer member from wedging between said cam surface and said torque transfer cylindrical surface to prevent said torque of said hollow-cylindrical rotary input shaft from being transferred to said rotary output shaft when said hollow-cylindrical rotary input shaft is rotated reversely.

23. The rotational transfer mechanism according to claim 14, wherein said accommodation space comprises a plurality of accommodation spaces formed between said circumferentially-uneven-width-space forming portion and said torque transfer cylindrical surface of said rotary output shaft,
- wherein said at least one torque transfer member is installed in each of said plurality of accommodation spaces.

24. The rotational transfer mechanism according to claim 14, wherein said circumferentially-uneven-width-space forming portion comprises circumferentially-uneven-depth grooves each extending in a longitudinal direction of said hollow-cylindrical rotary input shaft and having different radial depths at different circumferential positions.

25. The rotational transfer mechanism according to claim 14, wherein said torque transfer member comprises a columnar member having an axis parallel to said rotational axis.

26. The rotational transfer mechanism according to claim 14, wherein a diameter of said cam-surface determining circle is determined by an angle between a first tangential line tangent to said cam surface at a point thereon where said torque transfer member is in contact with said cam surface and a second tangential line tangent to said torque transfer cylindrical surface at a point thereon where said torque transfer member is in contact with said torque transfer cylindrical surface.

* * * * *